(12) United States Patent
Helfrich et al.

(10) Patent No.: US 12,441,472 B2
(45) Date of Patent: Oct. 14, 2025

(54) LIGHTWEIGHT OVERHEAD STOWAGE COMPARTMENT AND METHOD OF INSTALLING THE SAME

(71) Applicant: Airbus Operations GmbH, Hamburg (DE)

(72) Inventors: Felix Helfrich, Hamburg (DE); Benedikt Kircher, Hamburg (DE); Thomas Hoffmeister, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/618,307

(22) Filed: Mar. 27, 2024

(65) Prior Publication Data

US 2024/0327001 A1    Oct. 3, 2024

(30) Foreign Application Priority Data

Mar. 29, 2023   (EP) ..................................... 23165200

(51) Int. Cl.
   B64D 11/00   (2006.01)
(52) U.S. Cl.
   CPC .................................. B64D 11/003 (2013.01)
(58) Field of Classification Search
   CPC ................................................... B64D 11/003
   See application file for complete search history.

(56) References Cited

U.S. PATENT DOCUMENTS

| | | | |
|---|---|---|---|
| 7,097,138 B2 * | 8/2006 | Stephan | B64D 11/003 244/118.6 |
| 8,096,152 B2 | 1/2012 | Wagh et al. | |
| 2009/0026318 A1 * | 1/2009 | Gross | H02G 3/0431 244/129.1 |
| 2015/0097081 A1 * | 4/2015 | Paulino | B64D 11/003 244/118.5 |
| 2017/0349288 A1 | 12/2017 | Fette et al. | |
| 2019/0017308 A1 * | 1/2019 | Chadwell | B64D 11/003 |
| 2019/0031351 A1 | 1/2019 | Roth et al. | |

FOREIGN PATENT DOCUMENTS

| | | |
|---|---|---|
| DE | 102009029120 A1 | 3/2011 |
| DE | 102019113929 A1 | 11/2020 |
| EP | 0411305 A1 | 2/1991 |
| EP | 0514957 A1 | 11/1992 |

OTHER PUBLICATIONS

European Search Report for corresponding European Patent Application No. 23165200.9 dated Sep. 22, 2023.

* cited by examiner

Primary Examiner — Joshua D Huson
Assistant Examiner — Shanna Danielle Glover
(74) Attorney, Agent, or Firm — Greer, Burns & Crain, Ltd.

(57) ABSTRACT

A lightweight overhead stowage compartment comprising a self-supporting hull having an open cross-section forming a stowage space and an opening to the stowage space, wherein in a longitudinal direction of the self-supporting hull any section of the self-supporting hull has an open end in the front and rear. The stowage compartment includes a vertical connector configured to be placed into the stowage space, wherein the vertical connector is mounted to the self-supporting hull at vertical sides of the vertical connector in a force transferring manner. At least one lid is mounted at an arbitrary section of the self-supporting hull and configured to close the opening to the stowage space.

17 Claims, 15 Drawing Sheets

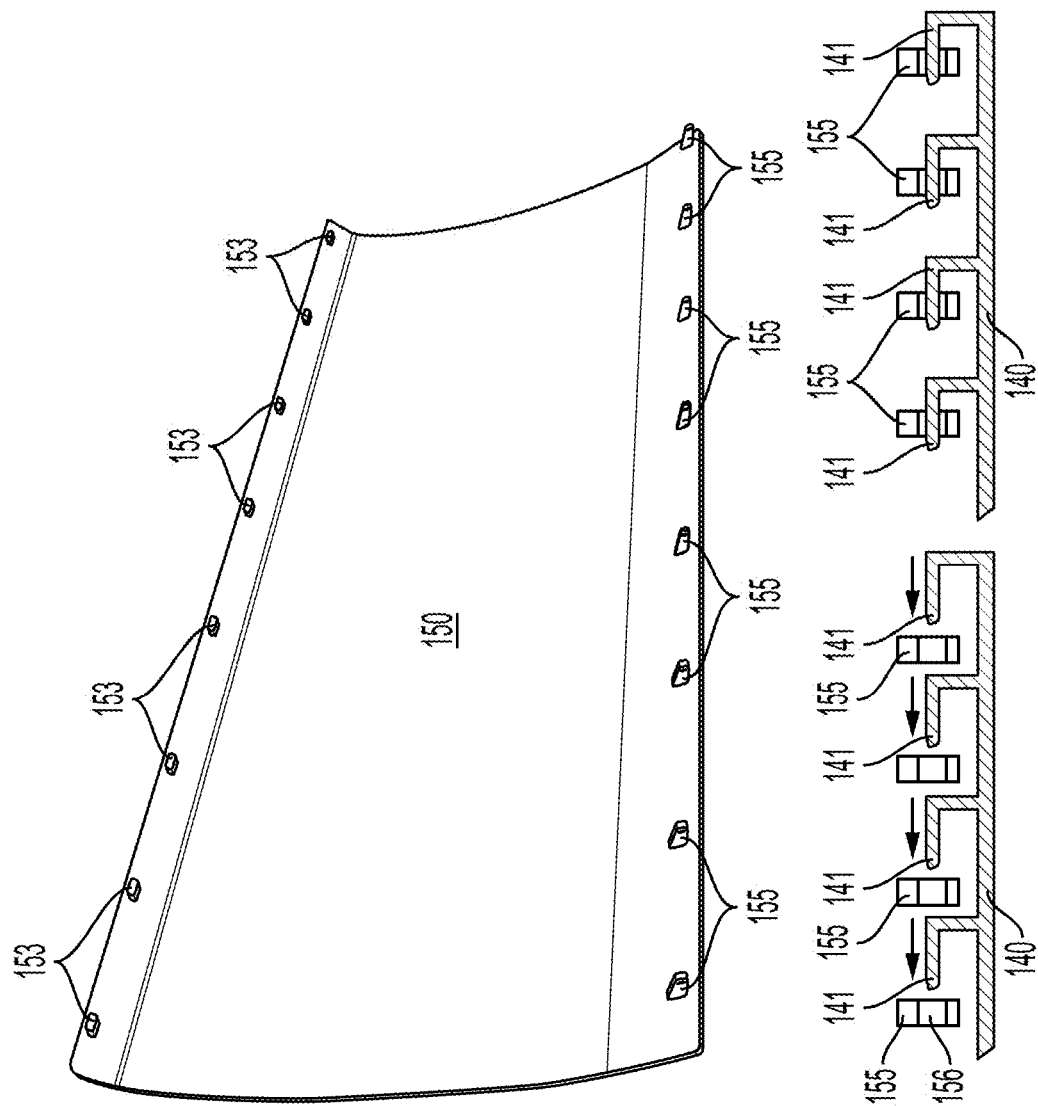

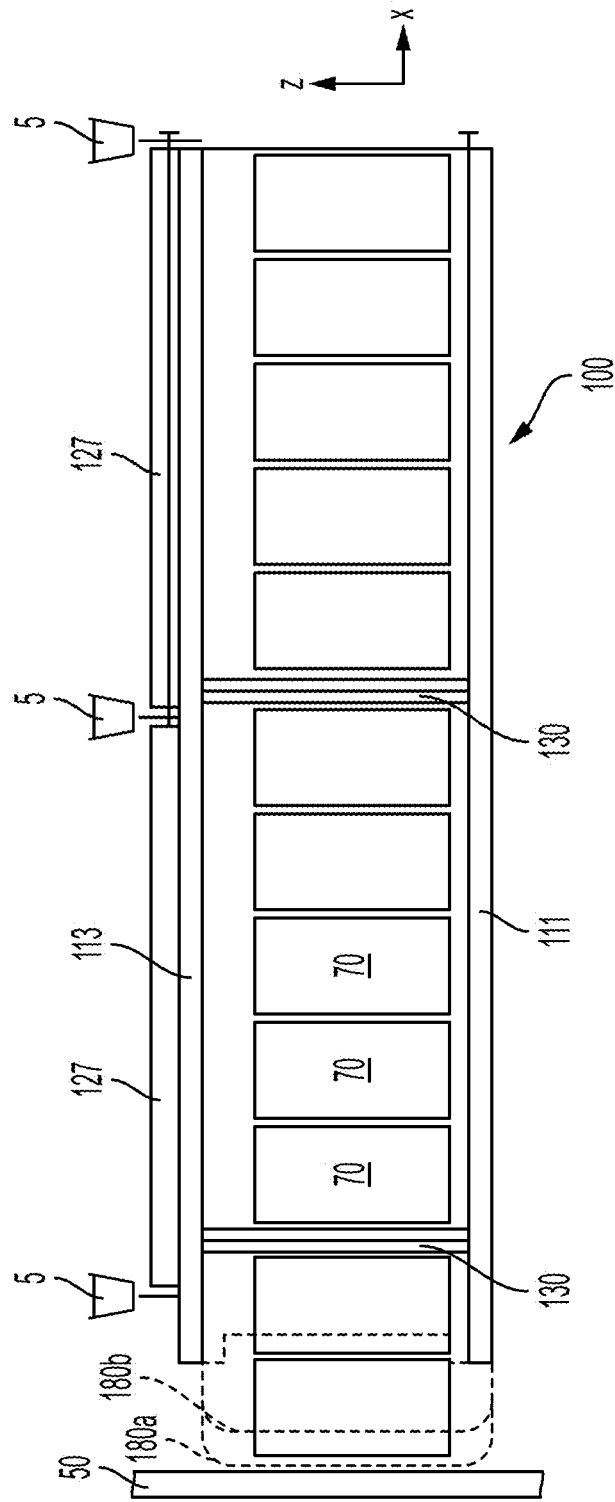

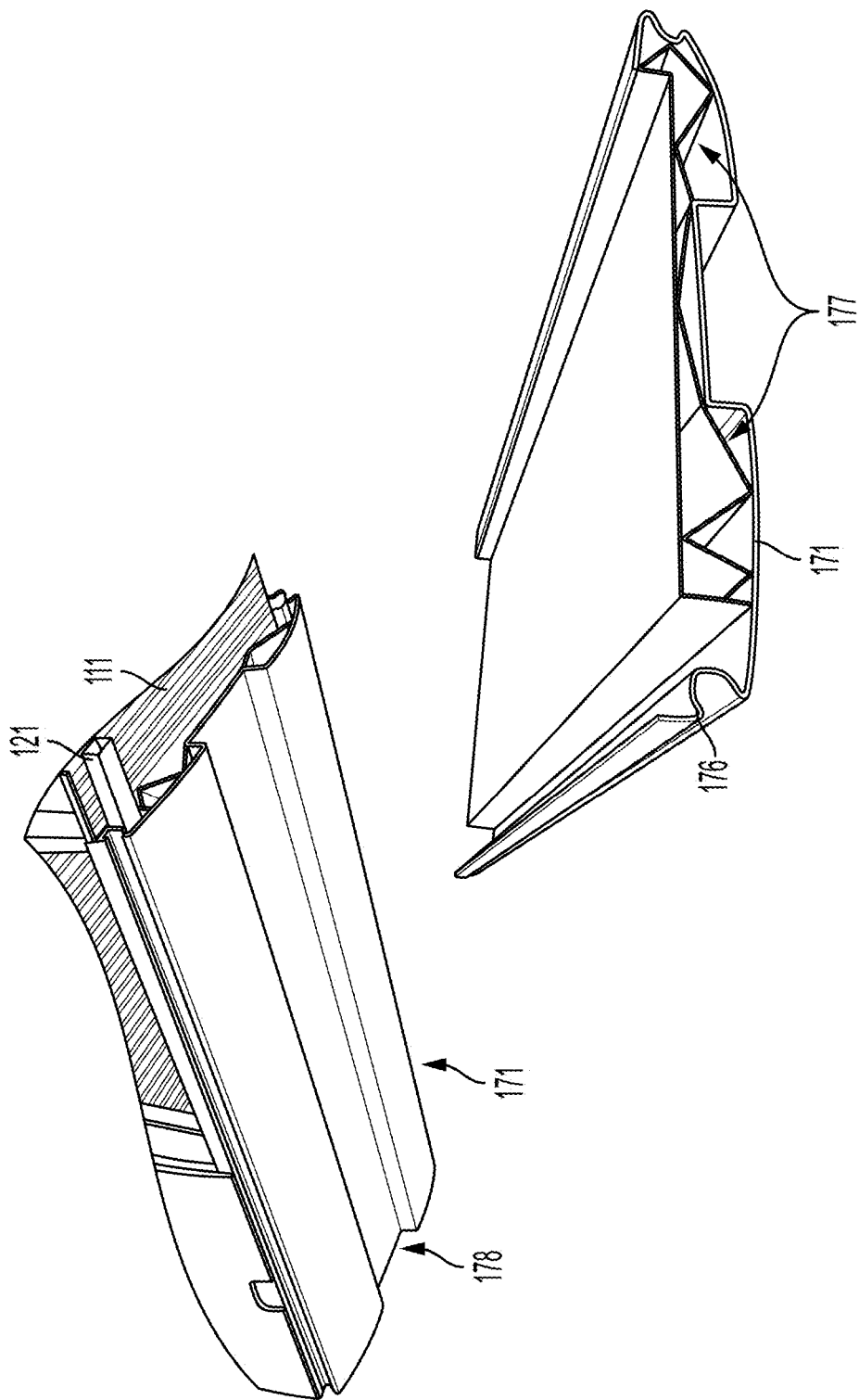

LIGHTWEIGHT OVERHEAD STOWAGE COMPARTMENT AND METHOD OF INSTALLING THE SAME

CROSS-REFERENCES TO RELATED APPLICATIONS

This application claims the benefit of European Patent Application Number 23165200.9 filed on Mar. 29, 2023, the entire disclosure of which is incorporated herein by way of reference.

FIELD OF THE INVENTION

The present disclosure generally relates to a lightweight overhead stowage compartment and a method of installing the same in an aircraft. Particularly, the present disclosure relates to an overhead stowage compartment comprising a self-supporting hull having an open cross-section and, in a longitudinal direction, any section of the self-supporting hull has an open end in the front and rear. The present disclosure further relates to a method of installing such overhead stowage compartment in an aircraft.

BACKGROUND OF THE INVENTION

A conventional overhead stowage compartment is a box-like structure having only one open side, which is closable by a lid. Such a stowage compartment usually has an integrated body consisting of a bottom, a ceiling and two sidewalls (one at each longitudinal end). Installation of a conventional stowage compartment begins with installing the integrated body into an aircraft. A lid is mounted to the sidewalls of the stowage compartment body either before or after installation of the stowage compartment body. In any case, each stowage compartment forms one unit.

Furthermore, conventional overhead stowage compartments are made from a rigid and a strong material, such as a honeycomb plate or form. The honeycomb plate or form provides sufficient material (thickness of the plate or form) for mounting or integrating a component of the stowage compartment. This is particularly necessary for the sidewalls of the assembly and other sections, where a hinge for the lid or a mount or the like is to be mounted or integrated.

However, such overhead stowage compartments are heavy, difficult to handle, particularly during installation, and are costly when they shall be customized. The overall aircraft weight is directly related to operating costs and fuel efficiency. Moreover, due to the weight and difficulty to reach the positions for mounting the stowage compartment in an aircraft, it is ergonomically unfavorable for the worker installing such stowage compartment.

SUMMARY OF THE INVENTION

It is therefore an object of the present disclosure to provide a simple and lightweight overhead stowage compartment.

This object may be solved by the present invention as defined in one or more embodiments described herein.

According to a first aspect to better understand the present disclosure, an overhead stowage compartment comprises a self-supporting hull having an open cross-section forming a stowage space and an opening to the stowage space, wherein in a longitudinal direction of the self-supporting hull any section of the self-supporting hull has an open end in the front and rear. An open cross-section means that a cross-section taken from the self-supporting hull is not a closed shape, and the "missing" part of the cross-section forms the opening to the stowage space over the entire length of the hull (viewing along the longitudinal direction). For instance, the cross-section of the self-supporting hull can have the form of a C or turned U.

The longitudinal direction of the self-supporting hull runs along the longest dimension of the self-supporting hull. For instance, the longitudinal direction of the self-supporting hull substantially corresponds to a longitudinal direction of an aircraft, into which the stowage compartment can be installed. In addition, the opening to the stowage space runs parallel to the longitudinal direction. The cross-section is a plane substantially perpendicular to the longitudinal direction.

Self-supporting means that the hull can be carried and handled at least during installation without additional support and without significant deformation of the hull, particularly without significant deformation of the cross-sectional shape of the hull. Moreover, the self-supporting hull can be further configured to, once installed, carry a minimum load. For instance, tools and other devices can be placed in the self-supporting hull (in its stowage space) without exceeding the weight carrying capacity of the hull.

The overhead stowage compartment further comprises a vertical connector configured to be placed into the stowage space, wherein the vertical connector is mounted to the self-supporting hull at vertical sides of the vertical connector in a load transferring manner. The vertical connector, once mounted to the self-supporting hull, is configured to carry vertical loads. For instance, the vertical connector can be mounted to a bottom portion of the hull and a ceiling portion of the hull and can transfer forces from the bottom to the ceiling and vice versa (i.e., compressive as well as tension forces in the vertical connector).

Thus, the vertical connector achieves an additional stability to the hull, while allowing the vertical connector to be placed anywhere along the longitudinal direction of the overhead stowage compartment. This allows great flexibility for the overhead stowage compartment, even after installation of the hull.

Moreover, the self-supporting hull can be configured to carry the loads of any luggage or other items placed in the overhead stowage compartment, particularly in the horizontal plane of a bottom region of the hull (in X- and Y-axes directions). The vertical connector transfers such loads in a vertical direction (Z-axis) towards a ceiling region of the hull.

The self-supporting hull can, hence, be made of a lighter and thinner material that can be designed and dimensioned for the main load case, i.e., carrying luggage and other goods. Compared to conventional materials of overhead stowage compartments, the self-supporting hull can be easily handled by a worker during installation in an aircraft, or alternatively a set of workers can install a substantially longer section of such a hull. Thus, installation of the overhead stowage compartment is significantly alleviated, as the weight to be carried and the complexity of the overhead stowage compartment is reduced.

Furthermore, the overhead stowage compartment comprises at least one lid mounted at an arbitrary section of the self-supporting hull and configured to close the opening to the stowage space. Since the at least one lid can be mounted anywhere along the longitudinal direction of the self-supporting hull, the disclosed overhead stowage compartment further provides great flexibility, even after installation of the hull. The at least one lid can be mounted to the overhead stowage compartment independent of the vertical connector.

Such an overhead stowage compartment can be easily handled and installed, since the self-supporting hull is lighter than a box-shaped conventional overhead stowage compartment. Likewise, since the opening to the stowage space runs along the entire longitudinal direction, the interior space (stowage space) of the hull can be easily reached during installation. Since the vertical connector can be mounted later, the weight of the individual components of the stowage compartment is reduced compared to a conventional stowage compartment.

In an implementation variant, the overhead stowage compartment can further comprise a separating wall separating the stowage space in the longitudinal direction of the self-supporting hull. Thus, the number and size of individual stowage spaces are not limited and are not set like in a conventional predefined stowage compartment. Moreover, the overhead stowage compartment can be customized in an easy and cost-effective manner. Such separating wall allows rearranging the layout and partitioning of the entire stowage space of the hull into smaller or larger stowage compartments, for example, according to a size of the lid or a size desired by an aircraft operator. The separating wall additionally renders the available stowage space larger, since the separating wall can be designed and dimensioned much smaller compared to the space required by two sidewalls of adjacent conventional stowage compartments plus the intermediate space between the two conventional stowage compartments.

In another implementation variant, the separating wall can form a vertical connector or a vertical connector can be integrated into the separating wall. Thus, a separating wall can be mounted to the self-supporting hull at vertical sides of the separating wall in a load transferring manner. The separating wall, once mounted to the self-supporting hull, is configured to carry vertical loads. For instance, the separating wall can be mounted to a bottom portion of the hull and a ceiling portion of the hull and can transfer forces from the bottom to the ceiling and vice versa (i.e., compressive as well as tension forces in the separating wall).

The separating wall achieves an additional stability to the hull, while allowing the separating wall to be placed anywhere along the longitudinal direction of the overhead stowage compartment. This allows great flexibility for the overhead stowage compartment, even after installation of the hull.

In an implementation variant, the overhead stowage compartment can further comprise at least one rail running in the longitudinal direction and connected to the self-supporting hull. Such rail may facilitate mounting the hull to a primary structure of the aircraft, since it provides a flexible longitudinal mounting area. In addition, a rail may increase overall strength of the hull as well as may increase the carrying capacity of the overhead stowage compartment. Particularly, vertical loads (in Z-axis direction) can be better distributed over the hull. Likewise, horizontal loads along the rail (e.g., in X-axis direction) can be better transferred from the hull to the rail and further to the primary structure of the aircraft. The rail can be mounted to the primary structure at individual mounting points, according to the primary structure of the aircraft.

Moreover, when employing at least one rail the material of the self-supporting hull can further be reduced in load carrying strength. For instance, the material of the self-supporting hull can be chosen thinner and/or lighter.

Alternatively or additionally, the overhead stowage compartment can further comprise at least one truss connected to the self-supporting hull. The at least one truss may be connected to at least one side of the hull, in order to strengthen this side. Furthermore, a truss provides additional strength in a further direction (compared to a rail), such as in the direction of the plane defined by the elements of the truss. As a mere example, a truss at a bottom or ceiling of the hull may provide additional strength in a horizontal direction (e.g., in Y-axis direction). Likewise, torsion and/or bending resistance of the hull is increased due to such truss.

In another implementation variant, the overhead stowage compartment can further comprise a further self-supporting hull having a seating element at a longitudinal end of the further self-supporting hull, wherein the seating element is configured to receive a longitudinal end of the (first) self-supporting hull to form a continuous stowage space along the self-supporting hulls. The seating element can be arranged at a front face of the further self-supporting hull, in order to receive a rear face of the (first) self-supporting hull. As a mere example, the seating element can have an L-shape or C-shape into which the rear face of the (first) self-supporting hull is inserted.

Such connection provides an easy installation of the entire stowage compartment and can create a gapless transition. For instance, the length of one of the self-supporting hulls can be simply adopted by cutting the self-supporting hull, while the cutting-edge is coupled to the seating element of the further hull. In addition, the L-shaped or C-shaped seating element can be sized, so that the rear face of the (first) self-supporting hull is fully received and forms a gapless or flush surface with the (first) self-supporting hull (at least at an interior surface of the self-supporting hull is flush).

In yet another implementation variant, the self-supporting hull can comprise a bottom, a rear wall and a ceiling. For instance, the self-supporting hull can have an open cross-section forming the portion of a (rectangular) box, where the opening to the stowage space is the part of the open cross-section that is left open. The angle between the bottom and the rear wall as well as the angle between the rear wall and the ceiling can be arbitrarily chosen, for example, depending on the surrounding available space as well as depending on the intended interior space. Since usually luggage, such as a plurality of suitcases, is stored in such an overhead stowage compartment, a rectangular cross-section of the stowage space (substantially right angles between bottom, rear wall and ceiling) can be chosen.

In a further implementation variant, at least the bottom and the ceiling have a plurality of notches configured to receive the vertical connector and/or the separating wall. The plurality of notches or grooves can be formed only on an interior side of the hull, where the vertical connector and/or the separating wall is installed. Alternatively, the thickness of the bottom, ceiling and optionally the rear wall can be continues along the longitudinal direction of the hull, so that a notch on an interior side of the hull forms a projection on the exterior side of the hull (like a trapezoidal sheet). Such shape (cross-section) of the bottom, ceiling and/or rear wall increase stability of the respective portion of the self-supporting hull. Particularly, the respective portion of the self-supporting hull having such shape has an increased resistance with respect to deflection (in the direction of the notch).

A notch at the bottom of the hull may correspond to a longitudinal position of a notch at the ceiling (and/or the rear wall). The distance between the outermost part of both notches substantially corresponds to the height of the vertical connector and/or the separating wall.

Furthermore, the vertical connector and/or the separating wall may be mounted to the hull, in order to transfer vertical loads from the vertical connector and/or the separating wall into the respective part of the hull. For instance, the vertical connector and/or the separating wall may be fastened to the hull with one or more fasteners (e.g., screws, rivets, etc.). Such fasteners can be arranged at the notch. Alternatively, the fasteners may be provided next to the notch and adjacent to the vertical connector and/or the separating wall, for example, holding a flange mounted to or formed at the vertical connector and/or the separating wall to the hull next to the vertical connector and/or the separating wall.

In an implementation variant, each notch can include a section overlapping a section of the vertical connector and/or the separating wall in a vertical direction and allowing a form fit between the notch and the vertical connector and/or the separating wall. As a mere example, the notch can have an omega-shape, into which a corresponding (widening) portion of the vertical connector and/or the separating wall is inserted. Thus, vertical loads can be transferred from the hull into the vertical connector and/or the separating wall and vice versa via the form fit, i.e., via the respective overlapping sections. Alternatively, the notch can have a rectangular, circular, or elliptical cross-section with an opening into the stowage space. In order to provide a holding edge to transfer vertical forces, the width of such opening can be smaller than the maximum width of the notch.

In another implementation variant, the overhead stowage compartment can further comprise a plurality of hinges configured to couple the self-supporting hull and the at least one lid. The individual hinges of the plurality of hinges can be arranged equispaced from one another. This allows an independent positioning of the at least one lid, since any of the plurality of hinges (any subset) can be used.

Alternatively or additionally, the overhead stowage compartment can further comprise a piano hinge configured to couple the self-supporting hull and the at least one lid.

In a further implementation variant, the at least one lid can have a frameless design including thinner materials, such as thin and flexible fabrics, foils, nets, tension cords or the like. In this case, the overhead stowage compartment can further comprise a mounting structure configured to receive an upper end of such thinner material, such as a recess. Thus, the thinner (flexible) material can be linearly mounted to a top portion of the overhead stowage compartment. For example, the thinner materials may simply be clamped at the top portion of the overhead stowage compartment.

In yet another implementation variant, the self-supporting hull can comprise a plurality of knuckles and the at least one lid can comprise a plurality of pins, each pin being configured to be inserted in one of the knuckles. The pins can be arranged equispaced from one another. The pattern of the plurality of pins can correspond to a pattern of the plurality of knuckles. This allows mounting the lid anywhere along the self-supporting hull.

Alternatively, the at least one lid can comprise a plurality of knuckles and the self-supporting hull can comprise a plurality of pins, each pin being configured to be inserted in one of the knuckles. The pins and knuckles can be arranged equispaced from one another, while both have a corresponding pattern. This allows mounting the lid anywhere along the self-supporting hull.

As a mere example, the plurality of knuckles can comprise five or more knuckles and the plurality of pins can comprise five or more pins. In other words, one lid is mounted to the hull by at least five pins and knuckles. This provides for a better distribution of the loads of the lid into the hull. This allows overall thinner and lighter structures for the lid and the hull, since no point load has to be introduced into the hull and/or lid.

In a further implementation variant, the overhead stowage compartment can further comprise a hinge stop wherein the at least one lid is formed to abut against the hinge stop, when the at least one lid is in a fully open position, where the lid is moved away from the opening to the stowage space. For instance, the hinge stop can be provided at one or more of the hinges, where a portion of the lid can abut against the hinge stop. The fully open position may be delimited by other components in the aircraft, by a height of the lid in the open position (where it can still be reached by an average person) or the like. There may likewise be a hinge stop for the closed position of the lid, i.e., a position where the opening to the stowage space is closed by the lid.

The lid may be provided with one or more flanges or one or more protrusions configured to abut against the hinge stop(s). Such flange or protrusion may further be designed to cover at least a portion of the hinge. Thus, on the one hand, the hinge can be protected from items, and a user can be protected from catching a finger between the lid and the hull at the hinge. On the other hand, the flange or protrusion may further block a line of sight to the hinge, so that the overhead stowage compartment can be designed optically neat.

In yet a further implementation variant, the overhead stowage compartment can further comprise a latch lever having a plurality of latch bolts. The plurality of latch bolts can be mounted to the latch lever in such a manner that moving the latch lever moves each of the plurality of latch bolts (simultaneously).

Furthermore, the at least one lid can include a plurality of locking members, each locking member having an eye. Each latch bolt can be configured to engage an eye of one of the locking members when the latch lever is moved into a locking position. The pattern of the latch bolts can correspond to the pattern of the locking members at the lid, so that all latch bolts simultaneously engage a respective eye of a corresponding locking member.

In an implementation variant, the number of latch bolts associated with one lid may be equal to the number of locking members associated with the one lid. Thus, a particular number of pairs of latch bolts and locking members holds the lid.

Alternatively, the number of latch bolts associated with the lid may be different from the number of locking members associated with the lid. For instance, the number of locking members associated with the lid can be smaller than the number of latch bolts associated with the lid. As a mere example, the lid does not provide locking members at certain positions corresponding to a latch bolt. In other words, when the lid is closed, some of the latch bolts are unused (not engaging a locking member).

Alternatively, a position for one of the plurality of latch bolts is left empty, i.e., only an opening or recess for receiving the locking member is provided at the bottom of the overhead stowage compartment.

In any case, 50 to 90%, preferably 60 to 90%, and most preferably 80% of the latch bolts can be unused or can be empty.

In another implementation variant, the plurality of latch bolts can be mounted into a front edge of a bottom plate of the overhead stowage compartment.

Additionally or alternatively, a fingertip rail or handrail may be arranged at a front edge of the bottom plate of the overhead stowage compartment, and the plurality of latch bolts can be mounted in, above or near to the fingertip rail or handrail. As a mere example, such rail can be made of a rigid plastic material or a metal, such as aluminum.

The solutions involving a rail (fingertip rail, hand rail and/or rail at bottom area of the lid) allow an integration of the latch mechanism into a plurality of differently designed overhead stowage compartments. Thus, a uniform look and design for overhead stowage compartments can be provided for a complete fleet of vehicles.

In a further implementation variant, the latch lever having a plurality of latch bolts (i.e., a latch mechanism) can be operated by a latch button that is configured to be mounted into the bottom of the overhead stowage compartment. The bottom of the overhead stowage compartment is to be understood as any structure arranged at the bottom side of the overhead stowage compartment. For instance, the bottom can include a structurally relevant bottom plate carrying the loads of the stowage compartment as well as a bottom cover arranged at an underside of the bottom plate, which fulfils rather visual and aesthetic needs. Alternatively or additionally, the latch button can be integrated into the bottom cover of the overhead stowage compartment. In any case, the latch button can be placed close to the lid to be opened and, at the same time, (most of the button parts) can be hidden in the bottom or bottom cover.

Since the latch button is mounted into the bottom of the overhead stowage compartment, it is possible that only one surface of the button is exposed to the exterior (e.g., the surface on which the button is touched), while the remaining surfaces of the button are hidden in the bottom of the overhead stowage compartment. Thus, the finishing of the surfaces of the latch button can be restricted to the exposed surface, which significantly reduces manufacturing costs. For instance, the latch and handle configuration of conventional single point latched overhead bins and lids comprises a plurality of large surfaces that are exposed and require a significant amount of surface finishing. This can be omitted in the solution provided by the present disclosure.

In another implementation variant, the rail may be produced longer than the width of one stowage space and/or one lid, i.e., the rail is associated with a plurality of stowage spaces and/or a plurality of lids. As a mere example, the rail may be manufactured by extruding or (cold or warm) drawing.

In yet another implementation variant, when the rail is longer than the width of a stowage space and/or a lid, the rail can include an arbitrary number of latch activations, such as latch buttons. As a mere example, only one latch button can be provided, which is used to engage or disengage all latches of the rail, i.e., engage or disengage all latches of all overhead stowage compartments and lids associated with the rail.

Alternatively, one latch button per lid can be installed in the rail.

In an implementation variant, the overhead stowage compartment can further comprise an end cap coupled to the self-supporting hull and closing the stowage space at a longitudinal end of the self-supporting hull. The end cap can be a two-dimensional component, like a separating wall.

As a mere example, the end cap can be formed to extend the stowage space of the self-supporting hull in the longitudinal direction. For instance, the end cap can have a bulgy or convex shape in the longitudinal direction. The size of the end cap can depend on an available space in the aircraft, such as the space between a longitudinal end of the self-supporting hull and an adjacent monument or other aircraft structure.

In an implementation variant, the self-supporting hull and/or the at least one lid can be made of a thermoplastic material. This allows pressing, such as deep drawing, or extruding the self-supporting hull and/or the lid, which are cost-effective manufacturing methods. Compared to conventional honeycomb plates and forms, the hull and lid of the present disclosure can be made more cost-effective, thinner and lighter.

Moreover, thermoplastic material can be reused or recycled, while the honeycomb plates and forms of conventional stowage compartments cannot be easily recycled. The reusing or recycling of the disclosed stowage compartment is further facilitated due to the individual components, such as the self-supporting hull, the vertical connector, the separating wall, the rails, etc., which can be disassembled in the same manner as they are mounted together. In addition, each of these components can be made of a material best suitable for the purposes of the component, which also facilitates reusing and recycling, as no material mixture or blend is present in these components.

The self-supporting hull and/or the at least one lid can further be reinforced. For instance, fiber reinforcement may be applied to the self-supporting hull and/or the at least one lid. Alternatively or additionally, a tension cord or net may be supplemented or integrated to the self-supporting hull and/or in the at least one lid. As a mere example, such fiber reinforcement, tension cord or net may be laid out in the material of the hull and/or lid in form of a strand (e.g., linear section) and/or in form of a truss (e.g., a zigzag pattern inside of the hull/lid).

In another implementation variant, the at least one lid and/or separating wall can at least partially be made of a fabric. For instance, due to the plurality of hinges and latches at each lid, the lid design can be restricted to only the limit loads needed to contain the luggage stored inside, while accepting some elastic deformation. This makes the lid much lighter than conventional stowage compartment lids. Likewise, the separating wall can be made thinner and lighter. As a mere example, such a component of the stowage compartment can include at least a portion of a frame over which the fabric is spanned.

According to a second aspect to better understand the present disclosure, an aircraft comprises at least one overhead stowage compartment according to the first aspect or one of its variants, alternatives and examples.

The overhead stowage compartment can be installed above a plurality of seat rows, where the opening to the stowage space of the overhead stowage compartment is accessible from an aisle running in a longitudinal direction of the aircraft adjacent to the seat rows. The lid can then be mounted to the hull of the stowage compartment in such a manner, that it opens above the seats and/or above the aisle.

The position of the vertical connector and/or the separating wall and/or the lid can depend on the position of the seat rows and/or can be adapted when changing the position of the seat rows.

According to a third aspect to better understand the present disclosure, a method for installing an overhead stowage compartment in an aircraft comprises at least the following steps:

providing a self-supporting hull having an open cross-section forming a stowage space and an opening to the stowage space, wherein in a longitudinal direction of the self-supporting hull any section of the self-supporting hull has an open end in the front and rear;

mounting the self-supporting hull to a primary structure of the aircraft;

placing at least one vertical connector into the stowage space;

mounting the vertical connector to the self-supporting hull at vertical sides of the vertical connector in a load transferring manner; and mounting at least one lid at an arbitrary section of the self-supporting hull, wherein the at least one lid is configured to close the opening to the stowage space.

Thus, installation of the overhead stowage compartment is simple and avoids heavy items to be lifted and installed.

In an implementation variant, the method can further comprise mounting at least one rail and/or at least one truss to the self-supporting hull along the longitudinal direction. Thus, an exterior reinforcement of the hull can be implemented. For instance, such exterior reinforcement may be designed to carry the loads of the maximum weight in the stowage space (e.g., when the stowage space is completely filled with luggage). The self-supporting hull, on the other hand, may be designed to carry its own weight, so that it is lighter during installation.

In another implementation variant, said mounting the at least one lid can comprise positioning the at least one lid, so that a plurality of knuckles is arranged next to a plurality of pins, and moving the at least one lid to engage each of the plurality of pins with one of the plurality of knuckles. Thus, a short linear movement is sufficient to install the lid.

As a mere example, the plurality of knuckles can be arranged at the self-supporting hull and the plurality of pins can be arranged at the at least one lid. Alternatively, the plurality of knuckles can be arranged at the at least one lid and the plurality of pins can be arranged at the self-supporting hull.

In an implementation variant, the method can further comprise mounting a separating wall to the self-supporting hull, wherein the separating wall separates the stowage space in the longitudinal direction of the self-supporting hull. The separating wall can include or form a vertical connector.

In another implementation variant, the method can further comprise mounting an end cap to the self-supporting hull and closing the stowage space at a longitudinal end of the self-supporting hull. The end cap can be a two-dimensional component and can be mounted to the self-supporting hull in the same manner as the vertical connector and/or the separating wall.

In a further implementation variant, the overhead stowage compartment can be the overhead stowage compartment according to the first aspect or one of its variants, alternatives and examples.

The present disclosure is not restricted to the aspects and variants in the described form and order. Specifically, the description of aspects and variants is not to be understood as a specific limiting grouping of features. It is to be understood that the present disclosure also covers combinations of the aspects and variants. Thus, each variant or optional feature can be combined with any other aspect, variant, optional feature or even combinations thereof.

BRIEF DESCRIPTION OF THE DRAWINGS

In the following, the present disclosure will further be described with reference to exemplary implementations illustrated in the figures, in which:

FIG. 8 schematically illustrates a perspective view of an interior side of a lid, and details of a latch mechanism for the lid;

FIG. 9 schematically illustrates a cross-section of a stowage compartment along a longitudinal direction;

FIG. 12 schematically illustrates a bottom cover at an underside of a stowage compartment and disassembled;

DETAILED DESCRIPTION OF THE PREFERRED EMBODIMENTS

In the following description, for purposes of explanation and not limitation, specific details are set forth in order to provide a thorough understanding of the present disclosure. It will be apparent to one skilled in the art that the present disclosure may be practiced in other implementations that depart from these specific details.

Figure 1:
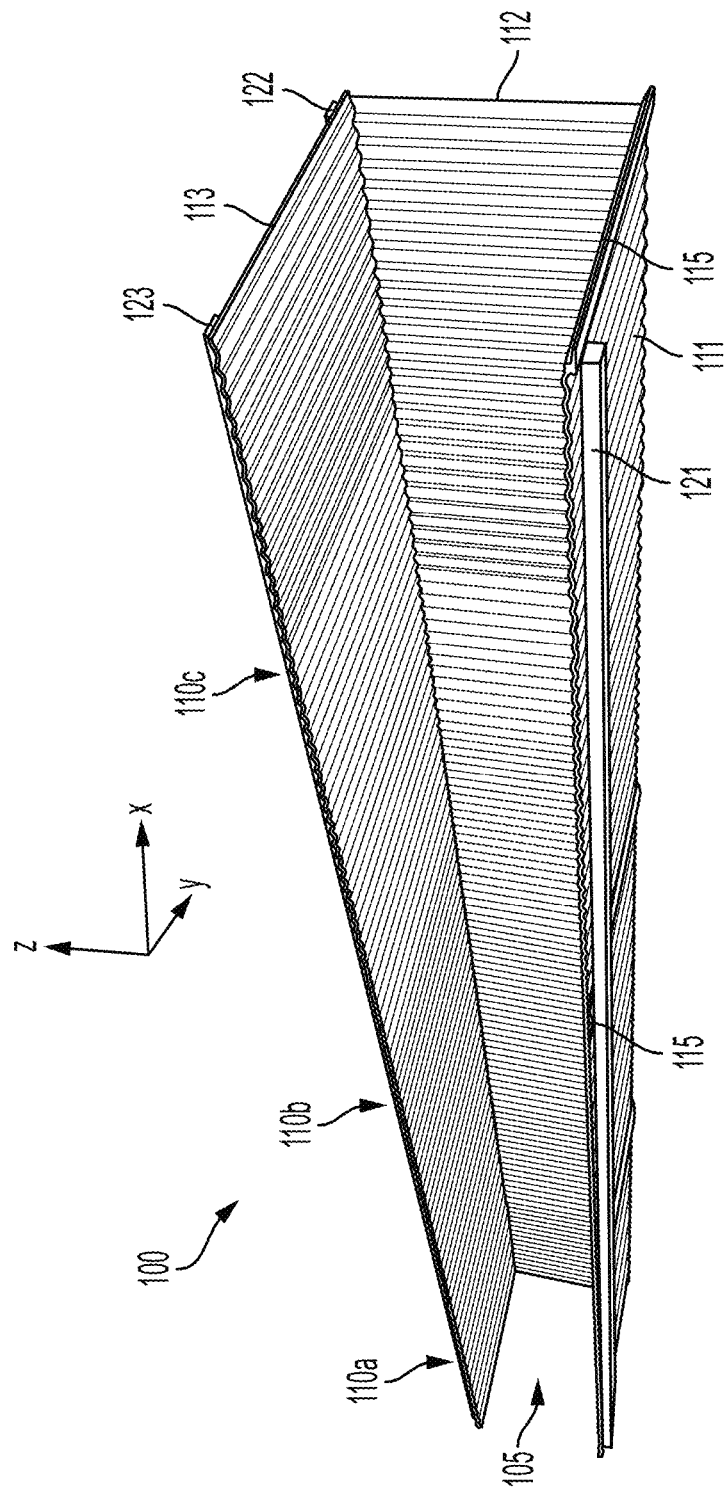
FIG. 1 schematically illustrates a self-supporting hull of a stowage compartment.

FIG. 1 schematically illustrates a self-supporting hull 110 of a stowage compartment 100. The self-supporting hull 110 has an open cross-section, here a rectangular C-shape consisting of a bottom 111, a rear wall 112 and a ceiling 113. The open cross-section defines a stowage space with an opening 105 to access the stowage space. The self-supporting hull 110 is built or mounted together in such a manner that the hull 110 carries at least its own weight, and preferably tools and equipment used during installation and placed in the stowage space. It is to be understood that any other cross-section can be implemented, wherein the cross-section surrounds and/or defines a stowage space having an opening 105.

A longitudinal direction (X-axis) of the self-supporting hull 110 runs along a length of the hull 110 (parallel to the longest dimension of the hull 110), and is preferably a horizontal axis, when the stowage compartment 100 is installed. Such longitudinal direction substantially corresponds to a longitudinal direction of an aircraft 1 into which such stowage compartment 100 can be installed (see FIG. 18). Accordingly, a vertical direction (Z-axis) runs perpendicular to the longitudinal axis and further perpendicular to the second horizontal axis (Y-axis). As a mere example, the bottom 111 spans in a plane defined by the X- and Y-axis, and the rear wall 112 spans in a plane defined by the X- and Z-axis, and the ceiling 113 spans in a plane defined by the X- and Y-axis at another level in Z-axis direction above the bottom 111. It is to be understood that the self-supporting hull 110 can be installed in a tilted manner. For example, the edge of the bottom 111 running along the opening 105 may lie higher (in Z-axis direction) than the opposite edge of the bottom 111, i.e., the corner between the bottom 111 and the rear wall 112.

The self-supporting hull 110, particularly the stowage space, has open ends at the front and rear, i.e., the stowage space is not delimited anywhere along the longitudinal direction (X-axis). Specifically, any section of the self-supporting hull 110 has an open end in the front and rear. In other words, when cutting the self-supporting hull 110 in cross-section (Y- and Z-axis plane) at any arbitrary position along the longitudinal direction, each of the resulting hull portions 110 has open ends in the front and rear, i.e., have no delimiting sidewall (in a cross-sectional plane (Y- and Z-axis plane)).

Figure 18:
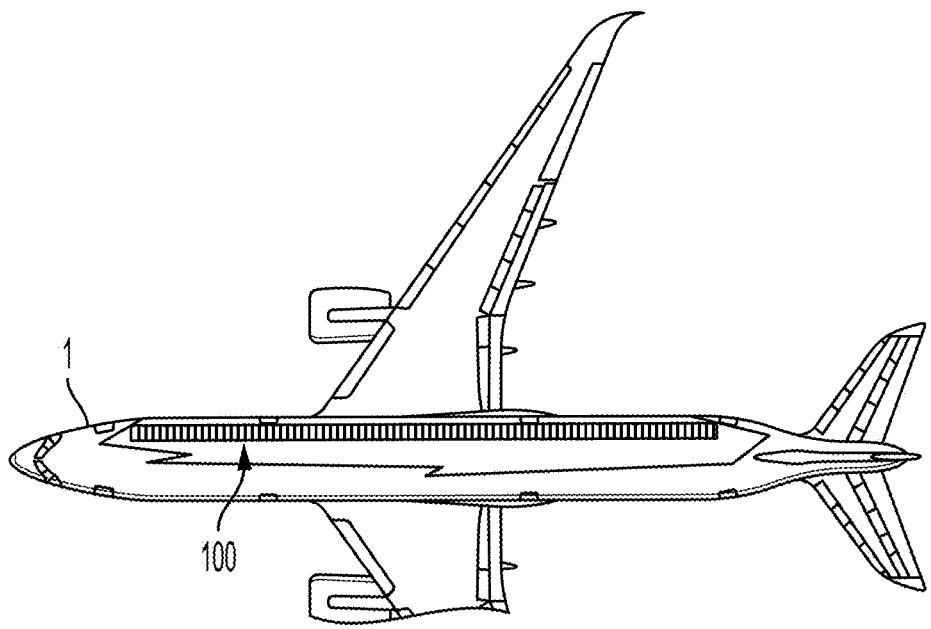
FIG. 18 schematically illustrates an aircraft.

As illustrated in FIG. 18, the self-supporting hull 110 can run along an entire aircraft 1, so that a continuous stowage space is available in the aircraft 1. Alternatively, the self-supporting holes 110 can run along a section of the aircraft 1, such as a section for business class, economy class, or the like. In any case, the self-supporting hull 110 having a continuous stowage space runs along a plurality of seat rows, such as five or more seat rows.

To facilitate installation of the self-supporting hull 110, the stowage compartment 100 can comprise at least one rail. FIG. 1 illustrates a first rail 121 running in a longitudinal direction and connected to the self-supporting hull 110, particularly at the bottom 111. FIG. 1 further illustrates a second rail 122 and third rail 123 also running in the longitudinal direction and connected to (the ceiling 113 of) the self-supporting hull 110. Such rails 121, 122, 123 increase stiffness and resistance of the self-supporting holes 110 with respect to forces acting on the self-supporting hull 110. The rails 121, 122, 123 distribute the loads induced by these forces, particularly, along the longitudinal direction. It is to be understood that the self-supporting hull 110 may have one rail 121-123, two rails, a plurality of rails or no rail at all.

The rails 121, 122, 123 can further be employed to mount the stowage compartment 100 to the aircraft 1. Thus, the rails 121, 122, 123 can first be mounted to the self-supporting hull 110 and such assembly can then be mounted to the aircraft 1. Alternatively, the rails 121, 122, 123 can first be mounted to the aircraft 1 and thereafter the self-supporting hull 110 is mounted to the rails, which decreases the weight of each component of the stowage compartment 100 to be carried into the aircraft 1 and mounted therein.

Since the self-supporting hull 110 can be made of a light and thin material, just configured to carry its own weight and a few light items (tools, etc.), the length of the self-supporting hull 110 can be chosen arbitrarily. While it could be possible to provide and install a self-supporting hull 110 to an aircraft 1 in one piece, i.e., having the total length of the required stowage space, the length may be limited by the weight to be carried by a worker. As a mere example, the maximum weight to be carried could be limited to 20 kilograms, so that the maximum length of the self-supporting hull 110 is predefined by this limit and the mass per length of the self-supporting hull 110.

For instance, the self-supporting hull 110 illustrated in FIG. 1 consists of three hull elements 110*a-c*, which are coupled to one another, and wherein, for example, each hull 110*a-c* weighs not more than the maximum weight to be carried by a worker. This coupling between two hull sections 110*a-c* may be achieved by a seating element 115, which is provided at a longitudinal end of a self-supporting hull 110*a-c* (illustrated in more detail in FIG. 3). The seating element 115 is configured to receive a longitudinal end of another self-supporting hull 110*b*, 110*c* to form a continuous stowage space through all self-supporting hulls 110*a-c*.

Moreover, the corners of the self-supporting hull 110 may be strengthened, in order to withstand forces and moments acting on the free portions of the cross-section of the self-supporting hull 110. Specifically, the bottom 111 and ceiling 113, when contemplating a cross-section thereof, are cantilever structures, which can induce a moment at the corner to the rear wall 112. The hull 110 may have at least one round corner, i.e., a continuous material (sheet) forming the bottom 111 and the rear wall 112 and/or forming the ceiling 113 and the rear wall 112, which is optimized to transfer any loads and forces from the bottom 111 or ceiling 113. Alternatively, a sharp corner may be formed, while this corner is strengthened by additional material or the like.

Figure 2:
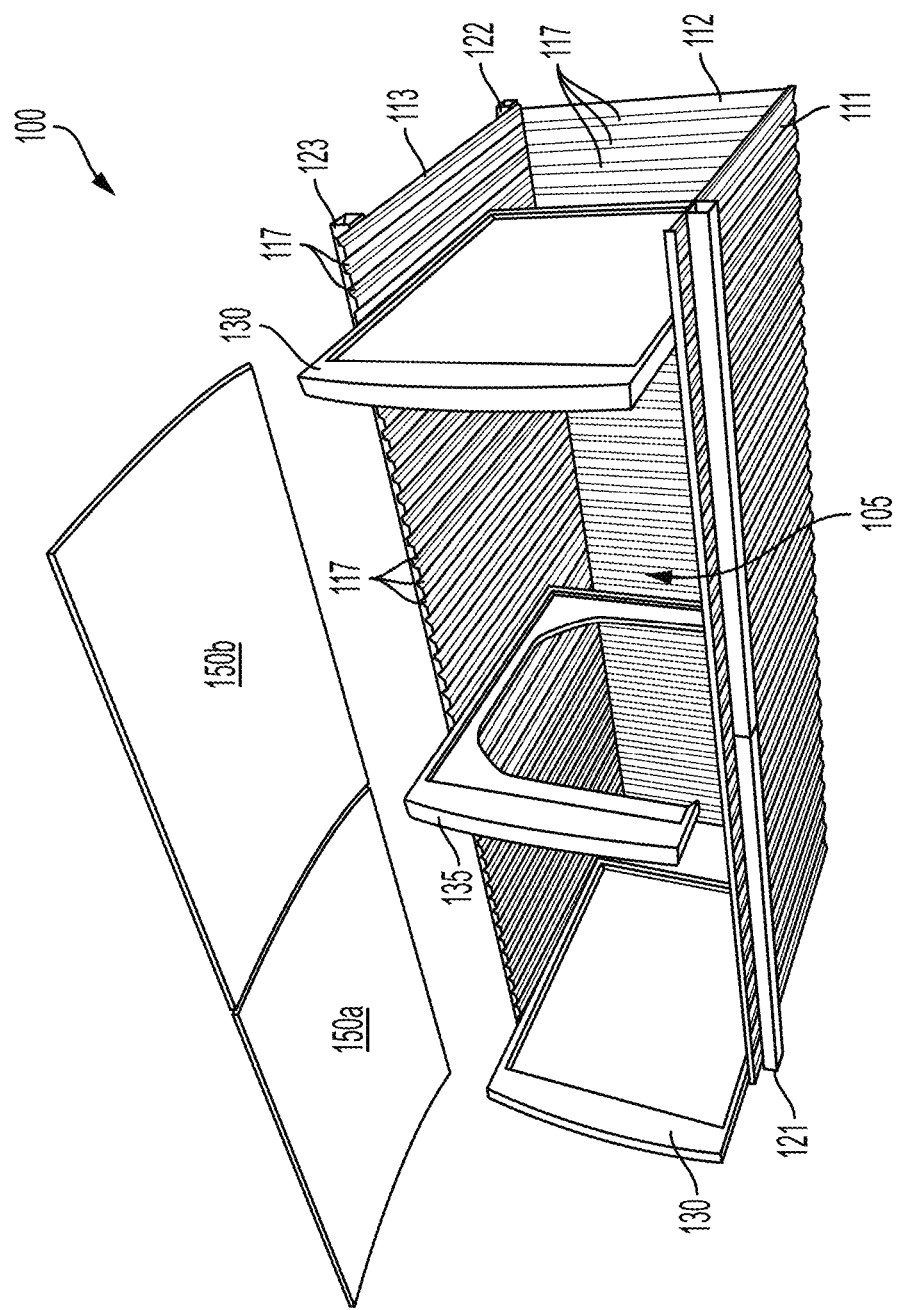
FIG. 2 schematically illustrates a perspective and exploded view of an exemplary stowage compartment.

FIG. 2 schematically illustrates a perspective and exploded view of an exemplary stowage compartment 100. The stowage compartment 100 comprises a separating wall 130, 135 configured to be placed into the stowage space and separating the stowage space in the longitudinal direction of the self-supporting hull 110. Thus, individual stowage spaces can be formed, while the size of such stowage spaces can be arbitrarily chosen and adapted anytime.

In addition, the separating wall 130, 135 is mounted to the self-supporting hull 110 at vertical sides of the separating wall 130, 135 in a force transferring manner. Such force transferring manner means that a compression or tension force can be transferred to and from the self-supporting hull 110 (particularly its bottom 111 and ceiling 113) into and from the separating wall 130, 135.

FIG. 2 illustrates two different types of separating walls 130, 135. While separating walls 130 form a separation of the stowage space, separating wall 135 has an open frame structure (like a gate or an upside-down U-shape). Separating wall 135 allows strengthening the self-supporting hull 110 with respect to forces in the Z-axis direction, while a majority of the stowage space is not separated, hence, allowing longer items to be placed in the stowage space.

It is to be understood that separating wall 135 is not restricted to a frame structure or gate-shape. As will be outlined with respect to FIGS. 10 and 16, a vertical connector 137 can be mounted to the self-supporting hull 110, which has a rather one-dimensional form, such as a column. Each of the separating walls 130, 135 can be seen as including or having integrated therein at least one vertical connector 137.

The separating walls 130 may also have a shape like the separating wall 135, but wherein a thin and light material closes the entire area of the separating wall 130. Such material can be a fabric, or a thin plastic sheet or foil, or a thermoplastic lightweight material. The center of the separating walls 130 may be designed and dimensioned to only withstand forces (in x-axis direction) induced usually when handling luggage and goods into and out of the stowage space and/or forces induced usually during operation of the aircraft 1, such as acceleration and deceleration of the aircraft 1. Thus, a light structure can be installed in the self-supporting hull 110 in order to strengthen and support the self-supporting hull 110, which is lighter than sidewalls of conventional overhead stowage compartments.

The stowage compartment 100 may be provided with a plurality of notches 117, arranged particularly at an interior side (facing the stowage space) of a portion of the self-supporting hull 110. For instance, the bottom 111 and/or the ceiling 113 and/or the rear wall 112 may have such plurality of notches 117. While the notches 117 can be provided only on the interior side, the material of the self-supporting hull 110 can be formed as a trapezoidal sheet (having an S-shaped or zigzag cross-section along the longitudinal direction). Such shape of the hull 110 can be formed by pressing, such as a deep drawing, the material of the hull 110.

Figure 10:
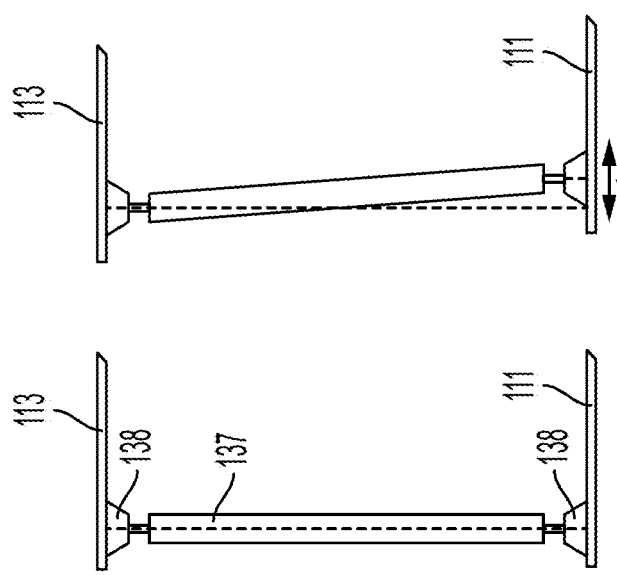
FIG. 10 schematically illustrates a vertical connector mounted in a self-supporting hull.

In any case, such notches 117 can increase stability of the self-supporting hull 110. In addition, the notches 117 can be configured to receive the separating wall(s) 130, 135 and/or a vertical connector 137 (FIG. 10). Thus, the notches 117 can be used to provide a predefined grid or pattern for installation of separating walls 130, 135 and/or vertical connectors 137. Such a grid or pattern may correspond to a grid or pattern of a seating rail (not illustrated) in the aircraft 1, so that a separating wall 130 can be installed in the stowage compartment 100 in correspondence to seat rows (not illustrated) in the aircraft 1. As a mere example, the grid or pattern of the notches 117 (the distance between the respective center of two notches 117) can be 1 inch, 2 inch or 3 inch.

The separating walls 130, 135 and/or the vertical connectors 137 can be slid into such notches 117, for example into a notch 117 in the bottom 111 and/or into a notch in the ceiling 113. For example, the separating wall 130, 135 can be inserted into the stowage space until the separating wall 130, 135 reaches the rear wall 112, in order to separate the stowage space. Once in place, the separating walls 130, 135 and/or the vertical connectors 137 can be mounted to the self-supporting hull 110. For example, fasteners, such as screws or rivets, can be used to fasten the separating walls 130, 135 and/or the vertical connectors 137 in a force transferring manner to the self-supporting hull 110. Such fasteners can be placed through the hull 110 into a front face of the separating wall 130, 135 and/or the vertical connector 137, for example, the front face of a separating wall 130, 135 and/or the vertical connector 137 placed in the notch 117. Alternatively, a flange or similar structure adjacent to the separating wall 130, 135 and/or the vertical connector 137 can be provided, which is fastened to the hull 110 as well as to the separating wall 130, 135 and/or the vertical connector 137, or which is integrated into the hull 110 and fastened to the separating wall 130, 135 and/or the vertical connector 137, or vice versa.

Figure 3:
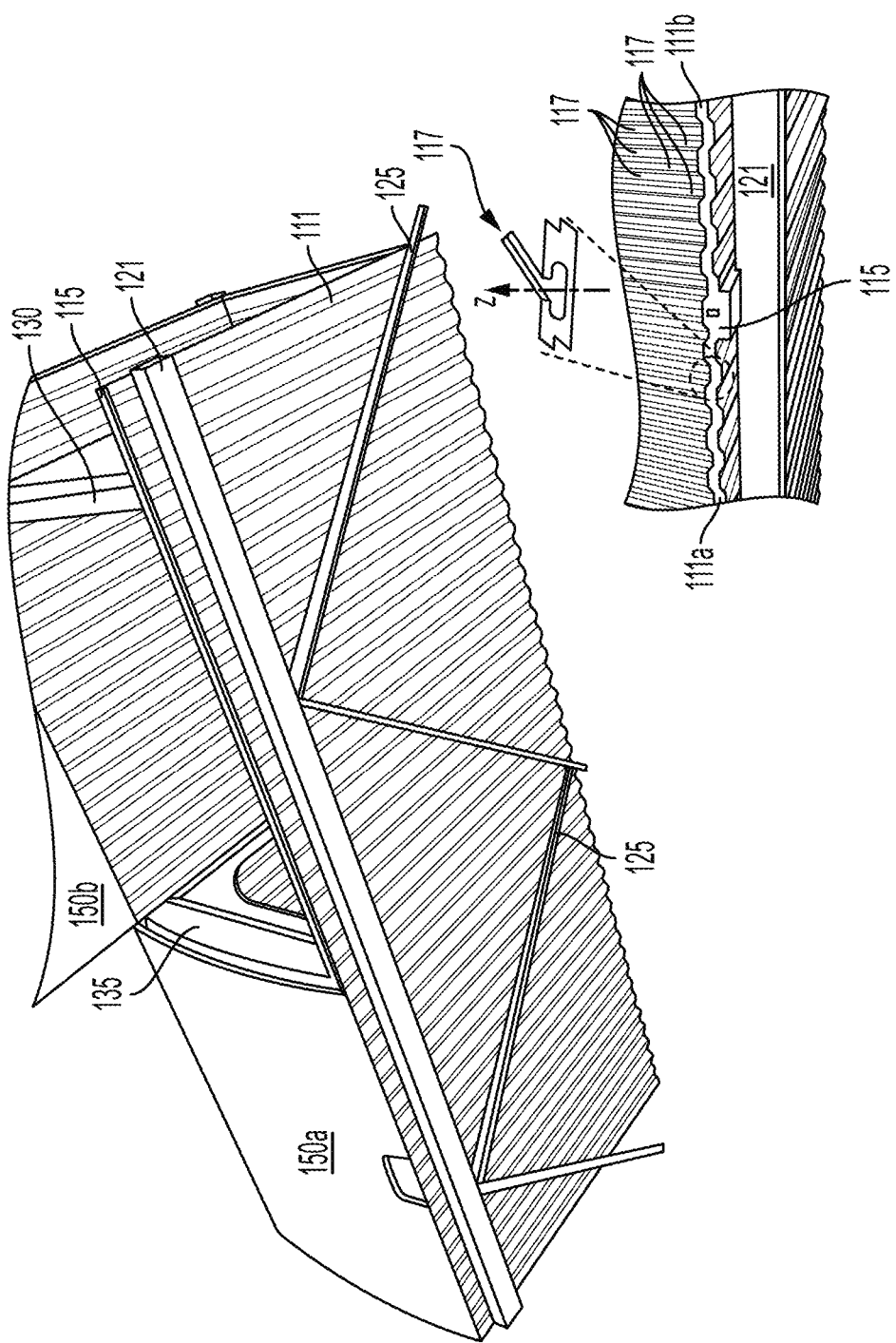
FIG. 3 schematically illustrates a perspective view of a stowage compartment from an underside thereof, and a detail of a longitudinal end of the self-supporting hull.

FIG. 3 schematically illustrates a perspective view of a stowage compartment 100 from an underside thereof, a detail of a longitudinal end of the hull 110, and a detail of an exemplary notch 117. The exemplary notch 117 includes a section overlapping a section of the separating wall 130, 135 and/or the vertical connector 137 in a vertical direction (Z-axis) and allowing a form fit between the notch 117 and the separating wall 130, 135 and/or the vertical connector 137. As illustrated in FIG. 3, such overlapping sections may be achieved by a notch 117 having an omega-shape, while a front face of the separating wall 130, 135 and/or the vertical connector 137 has a corresponding omega-shape that fits into the notch 117 in a formfitting manner. If such shapes are provided on both front faces of the separating wall 130, 135 and/or both ends of the vertical connector 137 corresponding to the bottom 111 and ceiling 113, the separating wall 130, 135 and/or the vertical connector 137 can be mounted to the hull 110 in a formfitting manner without fasteners, but still in a force transferring manner with the hull 110. Moreover, fasteners may be used only at the rear wall 112, in order to avoid misplacing or removal of the separating wall 130, 135.

FIG. 3 further illustrates a truss 125 connected to the self-supporting hull 110, specifically a truss 125 connected to the bottom 111 of the hull 110. The truss 125 further strengthens the hull 110, particularly with respect to forces and moments induced in the bottom 111. The truss 125 may include a rail 121 as illustrated in FIG. 3. It is to be understood that the bottom 111 of the hull 110 may be covered by a lining or similar component covering at least a portion of the bottom 111 and/or the truss 125. This cover (not illustrated) may further include other components required in the aircraft, such as a personal service unit, fresh air nozzles, O2 masks, etc.

Furthermore, the overhead stowage compartment 100 illustrated in FIG. 3 further includes at least one lid 150 (FIG. 3 illustrates schematically to lids 150*a* and 150*b*). Such a lid 150 can be mounted at an arbitrary section to the self-supporting hull 110 and is configured to close the opening 105 to the stowage space. As a mere example, the lid 150*a* ends in a longitudinal direction of the stowage compartment 100 where a separating wall 135 is mounted. However, this is not necessary, since the separating walls 130, 135 can be placed independent of the lid 150. This allows great flexibility of the stowage spaces as well as the interior (visible) design of the aircraft 1, which corresponds to a great extent to the look of the lids 150.

FIG. 3 further illustrates a detail of a longitudinal end of the self-supporting hull 110. Specifically, this detail shows a seating element 115 at a bottom 111*a* of a first self-supporting hull 110*a* (FIG. 1) receiving a longitudinal end of a bottom 111*b* of an adjacent self-supporting hull 110*b*. The inner shape of the seating element 115 can be formed by an L-shape (illustrated) or a C-shape, into which the longitudinal end of the bottom 111*b* is inserted or received. As is derivable from FIG. 3, the longitudinal end of the bottom 111*b* can be cut arbitrarily, for example to achieve a certain length of the self-supporting hull 110, and can still be placed into the seating element 115. A connection between both hulls 110*a* and 110*b* may be achieved by fastening or adhering both hulls 110 to one another and/or by having a rail 121 connecting both hulls 110*a* and 110*b*.

Figure 4:
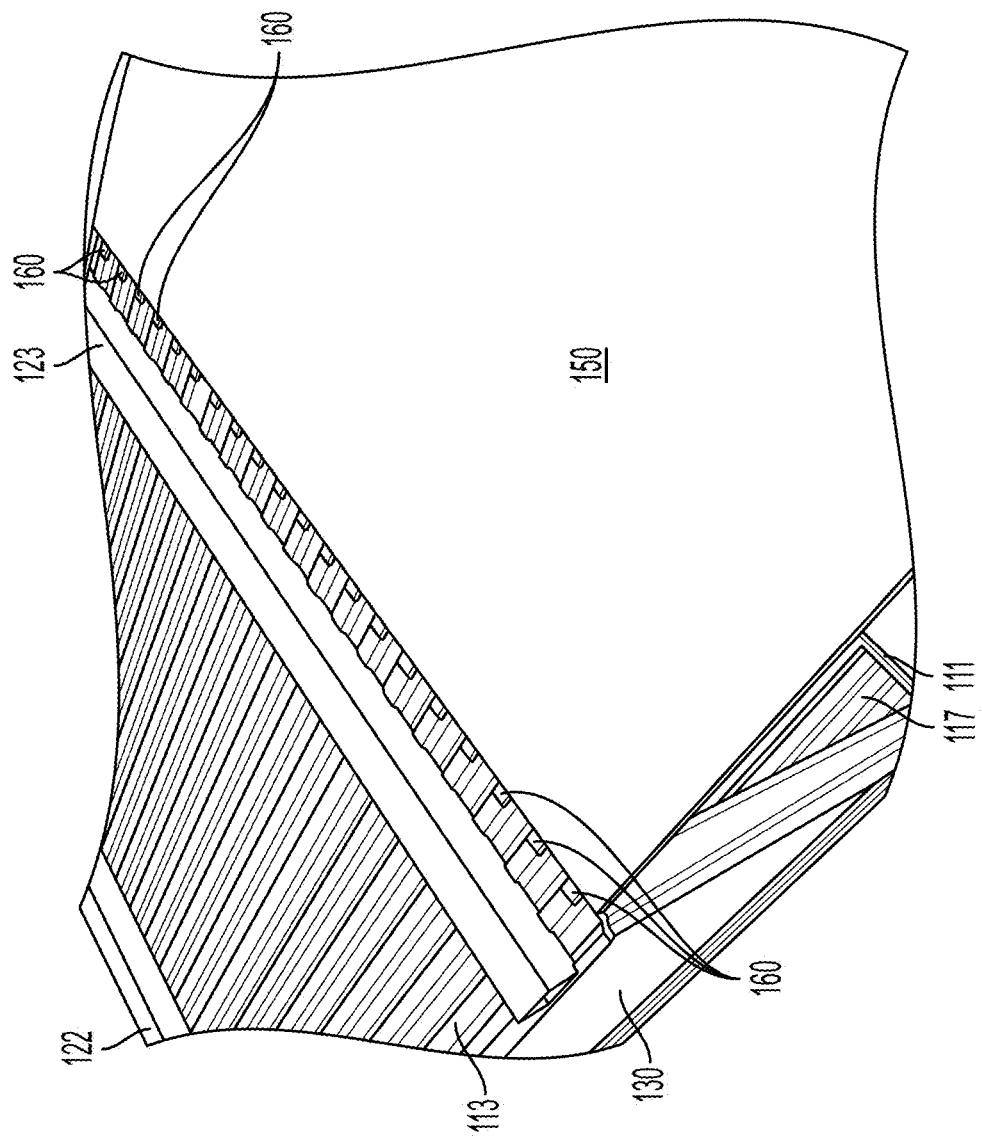
FIG. 4 schematically illustrates a perspective view of a stowage compartment from an upper side.

FIG. 4 schematically illustrates a perspective view of a stowage compartment 100 from an upper side. Firstly, there may be one or more rails 122, 123 mounted on the ceiling 113 of the hull 110. Besides the strengthening of the hull 110 due to the rails 122, 123, each of the rails 122, 123 can be used as or can form an attachment means for the overhead stowage compartment 100 to a primary structure 5 of the aircraft 1 (FIG. 9).

Secondly, the hull 110 may be equipped with a plurality of hinges 160 configured to couple the self-supporting hull 110 and the at least one lid 150. FIG. 4 illustrates a plurality of hinges 160 corresponding to the notches 117, which is only one example of placing the hinges 160. It is to be understood that a distance between two adjacent hinges 160 may be arbitrarily chosen.

Figure 5:
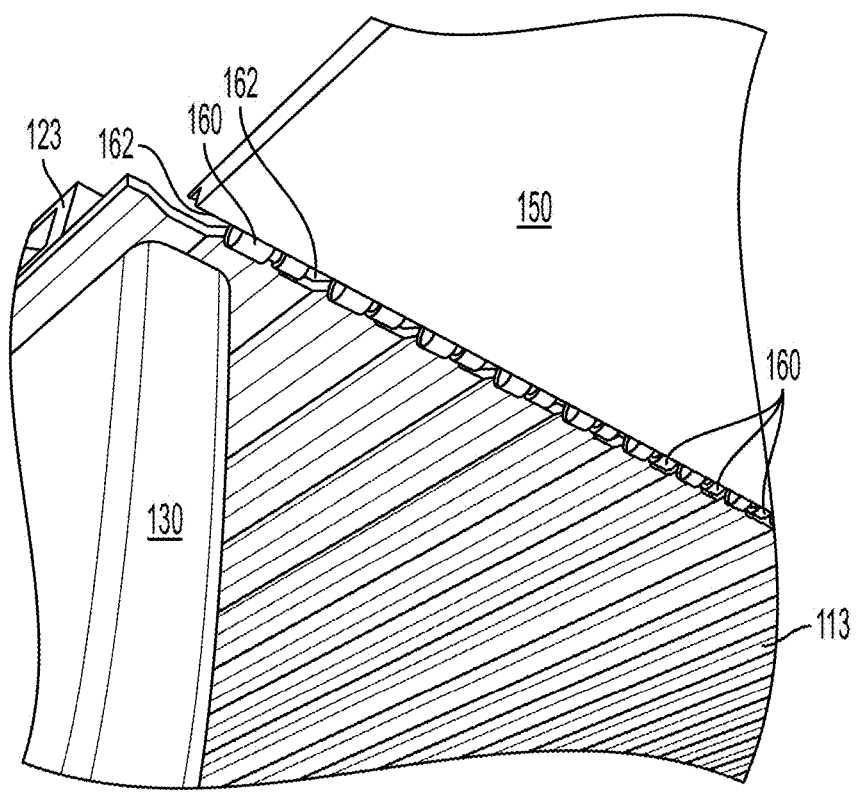
FIG. 5 schematically illustrates a perspective view of a stowage compartment ceiling and lid.

FIG. 5 schematically illustrates a perspective view of a stowage compartment ceiling 113 and lid 150 viewing upwards and into the stowage space. As is derivable from FIG. 5, the plurality of hinges 160 connect the lid 150 to the hull 110, particularly the ceiling 113. A gap between the ceiling 113 and the lid 150 may be left open between two adjacent hinges 160. Such opening allows smoke to exhaust or escape from the stowage space.

FIG. 6 schematically illustrates different hinges 160 between a hull 110 and lid 150. In FIG. 6a-c, the respective hinges 160 have a different bracket 161a-c connecting the hinge 160 to the ceiling 113. Each of these brackets 161a-c provides an attachment of the hinge 160 at a different vertical level (height). Alternatively, a bracket 161 may be configured to allow adjustment of a vertical level of the hinge 160. In any case, this allows adjusting a mounting height of the lid 150.

Figure 6A:
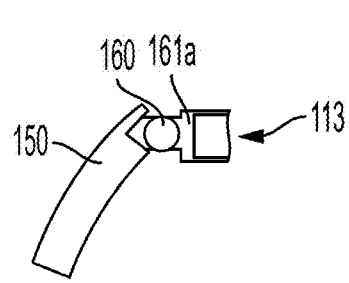
FIG. 6 schematically illustrates different hinges between a self-supporting hull and lid.
Figure 6B:
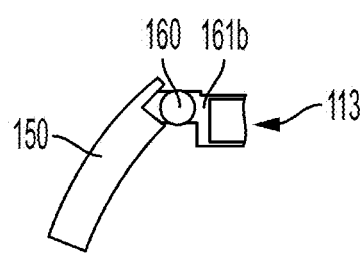
Figure 6C:
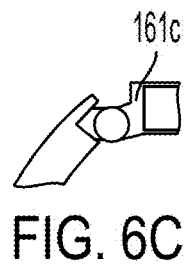
Figure 6D:
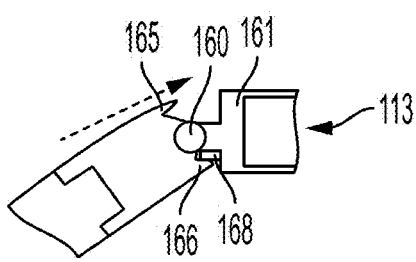

In FIG. 6d the overhead stowage compartment 100 further comprises a hinge stop 168. The lid 150 is formed to abut against the hinge stop 168, when the lid 150 is in the closed position. It is to be understood that the lid 150 illustrated in FIG. 6d is not in the closed position, which would correspond to a substantially vertically arranged lid 150. This is for illustrative purposes only, in order to more clearly show the function of the hinge stop 168.

Figure 6E:
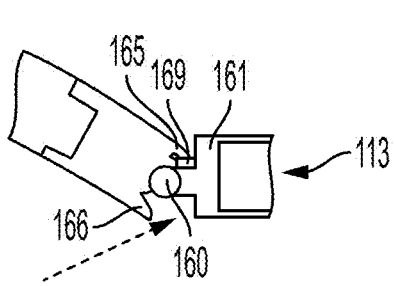

FIG. 6e shows an overhead stowage compartment 100 further comprising a hinge stop 169, there the lid 150 abuts against such hinge stop 169, when the lid 150 is in a fully open position. While this drawing shows only the hinge stop 169, it is to be understood that a stowage compartment 100 may comprise both hinge stops 168, 169.

In any case, the hinge stops 168, 169 may be made from an elastic material, in order to decelerate a movement of the lid 150 when reaching the closed position and fully open position, respectively. Alternatively, one or both of the hinge stops 168, 169 are made of a rather rigid material, in order to achieve a precise closed and/or fully open position.

Furthermore, the lid 150 may be mounted to the hinge 160 by a corresponding bracket (highlighted in FIG. 6d-e). Alternatively, the lid 150 may be formed at its upper end (edge) to be easily hinged to the ceiling 113.

In FIGS. 6d-e the upper end (edge) of the lid 150 is provided with protrusions 165, 166. Such protrusions 165, 166, on the one hand, may be employed to abut against a respective hinge stop 168, 169. An additional function of such protrusions 165, 166 may be forming a cover of the hinge 160. As is illustrated in these drawings by a dashed arrow, the line of sight to the hinge 160 is blocked by each of these protrusions 165, 166 in the open and closed position of the lid 150.

Such protrusions 165, 166 may be part of a bracket mounted to the lid 150. Alternatively, an outer layer of the lid 150 may be extended or a hinge receiving part of the upper end (edge) of the lid 150 may be formed as a recess to achieve the protrusions 165, 166.

Figure 7:
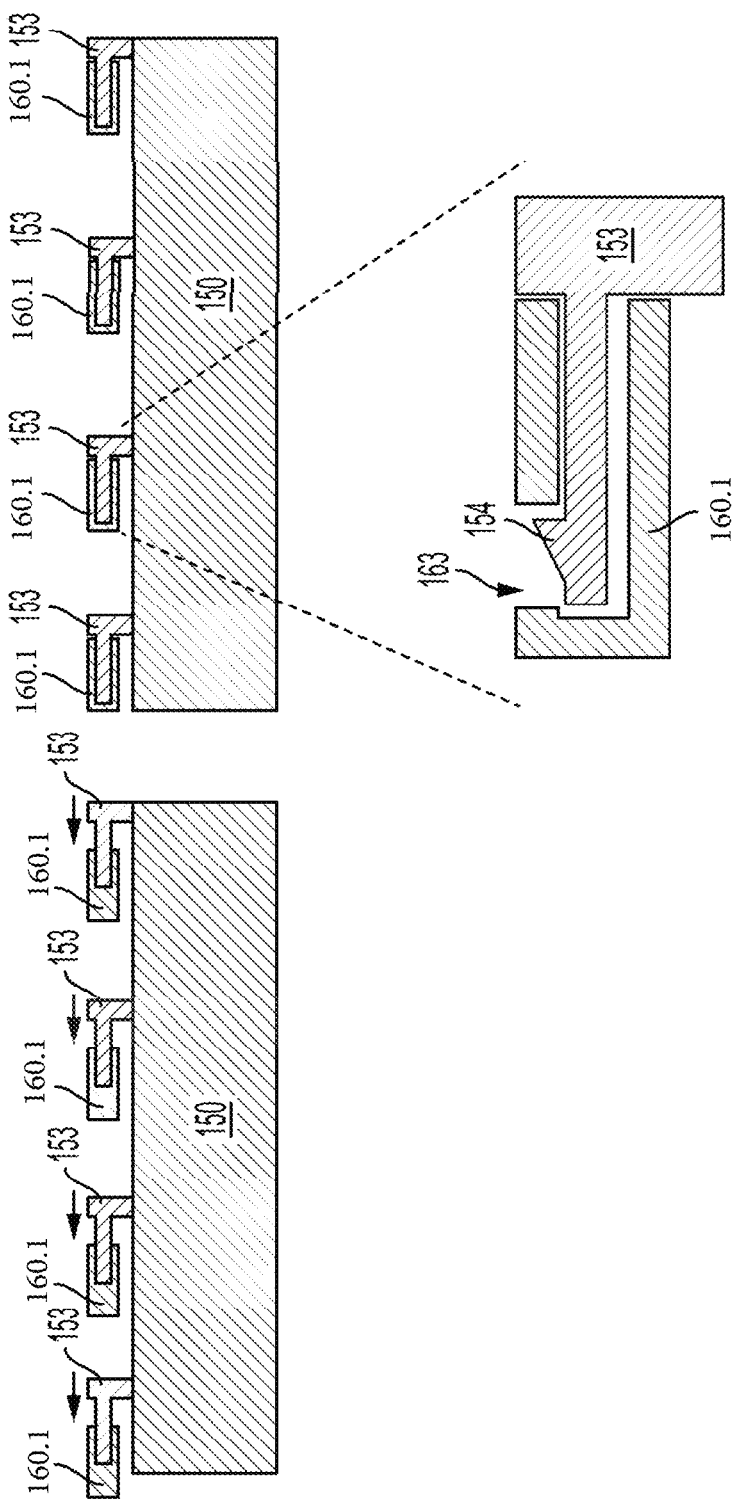
FIG. 7 schematically illustrates hinges between a self-supporting hull and lid during installation of the lid.

FIG. 7 schematically illustrates hinges 160 between a hull 110 and lid 150 during installation of the lid 150. On the left-hand side in FIG. 7, the lid 150 is illustrated as having a plurality of pins 153. Such pins 153 may include a bracket extending from the upper end (edge) of the lid 150, so that the corresponding pin 153 is spaced apart from the upper end (edge) of the lid 150. The self-supporting hull 110 (not illustrated in FIG. 7) comprises a plurality of knuckles 160.1, each of which is configured to receive a pin 153. The lid 150 and, hence, all pins 153 can be moved to insert the pins 153 in a respective knuckle simultaneously, which is schematically illustrated in FIG. 7 by corresponding arrows.

On the right-hand side in FIG. 7 the lid 150 has been moved towards the left, so that all pins 153 are fully inserted into the knuckles 160.1. In the detail of FIG. 7, an optional holding mechanism of the pin 153 is illustrated. For instance, the pin 153 may include a latch-like protrusion 154, which can mate with an opening 163 in the knuckle 160.1. Thus, once the lid 150 and the pins 153 have been moved (to the left in FIG. 7), the protrusions 154 of the pins 153 may snap or latch into the opening 163 of the knuckle 160.1, so that the lid 150 is affixed to the hull 110. It is to be understood that the opening 163 may extend in a circumferential direction of the knuckle 160.1, in order to allow the protrusion 154 to rotate in the knuckle 160.1, when the lid 150 moves between the closed position and the fully open position.

Due to the large number of hinges 160, the forces to be transferred from the lid 150 into the hull 110 can be better distributed compared to conventional stowage compartments. Thus, the lid 150 can be made of a thinner and lighter material, as the major load case is holding back luggage and goods from leaving the stowage space. In addition, the large number of hinges 160 allows installation of the lid 150 in an arbitrary longitudinal position of the hull 110. The finer the grid or pattern of the hinges 160, the finer is the freedom of installation position of the lid 150 relative to the hull 110.

FIG. 8 schematically illustrates a perspective view of an interior side of a lid 150, and details of a latch mechanism for the lid 150. Specifically, while brackets and pins 153 may be provided in an upper region of the lid 150, for attachment to the ceiling 113 via knuckles 160.1 (together forming hinges 160) (see FIG. 7), locking members 155 may be provided in a lower region of the lid 150. As can be derived from the detailed drawings in FIG. 8, such locking members 155 may form a protrusion on the inner side of the lid 150. Each of the locking members 155 can include an eye (recess, or through hole) 156.

The overhead stowage compartment 100 may further comprise a latch lever 140 having a plurality of latch bolts 141. The latch lever 140 may be coupled to the hull 110, particularly, to the bottom 111 of the hull 110. The latch lever 140 may be mounted to the hull 110 in a manner that it can be slid or otherwise moved in a direction parallel to the extending direction of the latch bolts 141 (indicated in FIG. 8 as arrows).

Once the lid 150 is in the closed position, the eyes 156 of all locking members 155 are in a position corresponding to a tip end of the latch bolt 141 (see the left-hand side in FIG. 8). Alternatively, the latch lever 140 may be configured to rotate around its longitudinal axis, in order to bring the latch bolts 141 into correspondence with the eyes 156. In any case, when the latch lever 140 is moved along its longitudinal direction into a locking position, each latch bolt 141 engages an eye 156 of one of the locking members 155 (see the right-hand side detail in FIG. 8).

Due to the large number of locking members 155 and latch bolts 141, the forces to be transferred from the lid 150 into the hull 110 can be better distributed compared to conventional stowage compartments. Thus, the lid 150 can be made of a thinner and lighter material, as the major load case is holding back luggage and goods from leaving the stowage space. In addition, the large number of locking members 155 and latch bolts 141 allows installation of the lid 150 in an arbitrary longitudinal position of the hull 110. The finer the grid or pattern of the locking members 155 and latch bolts 141, the finer is the freedom of installation position of the lid 150 relative to the hull 110.

As a mere example, the grid or pattern of the locking members 155 and latch bolts 141 may correspond to the grid or pattern of the hinges 160, so that the lid 150 can be easily placed at different positions along the hull 110.

FIG. 9 schematically illustrates a cross-section of a stowage compartment 100 along a longitudinal direction. The stowage compartment 100 is illustrated without lids 150, so that the stowage space can be seen through the opening 105. The stowage compartment 100 can be mounted to a primary structure 5 of the aircraft 1. As a mere example, such primary structure 5 can be formers or frames of the aircraft 1. Alternatively, an installation rail (not illustrated) may be mounted to the primary structure 5 of the aircraft 1, to which the stowage compartment 100 can then be mounted. In the stowage space, a plurality of luggage pieces 70 (or goods) can be placed. The hull 110 is strengthened in a vertical direction (Z-axis) by separating walls 130 and/or vertical connectors 137 (not illustrated in FIG. 9). In addition, the ceiling 113 can be strengthened by a truss 127 mounted to the ceiling 113 on an exterior side of the hull 110. As a mere example, such truss 127 may include one or more rails 122, 123 (FIG. 1) and/or may be formed like the truss 125 at the bottom 111 (FIG. 3).

In order to close the stowage space at a longitudinal end of the (entire) self-supporting hull 110, there could be a separating wall 130. Alternatively, and as illustrated in FIG. 9, an end cap 180 could be coupled to the self-supporting hull 110, which closes the stowage space at a longitudinal end of the self-supporting hull 110. As a mere example, the end cap 180 could be shaped, in order to be mounted to an interior side of the self-supporting hull 110. For instance, the end cap 180 may be provided with protrusions corresponding to the outer circumference of a separating wall 130, 135, so that the end cap 180 may be mounted to the hull 110 in the same manner as a separating wall 130, 135.

The end cap 180 could further be formed to extend the stowage space of the self-supporting hull 110 in the longitudinal direction. As mere examples, FIG. 9 illustrates with dashed lines two possible end caps 180a and 180b of different extending length. For instance, the extending length of the end cap 180 may be predefined by an interior structure 50 of the aircraft 1, such as a monument 50 arranged at the longitudinal end of the self-supporting hull 110. If such monument 50 is replaced or moved, a different end cap 180 could easily be installed, in order to cover the (now differently sized) gap between the monument 50 and the hull 110.

It is further possible to provide only one end cap 180, but mounted to the hull 110 at a different longitudinal position, in order to fill the gap to the monument 50. As a mere example, the end cap 180 could be received in one of the notches 117, so that choosing a particular notch 117 specifies the lengths of the end cap 180 extending over the longitudinal end of the hull 110.

FIG. 10 schematically illustrates a vertical connector 137 mounted in a self-supporting hull 110. Specifically, a vertical side (upper end or bottom end) of the vertical connector 137 is mounted to the ceiling 113 or the bottom 111, respectively. This can be achieved by a carrier 138. For instance, a carrier 138 can be provided at each end (vertical side) of the vertical connector 137. The carrier 138 can have a shape to facilitate mounting to the ceiling 113 and bottom 111. For instance, the carrier 138 can have a shape corresponding to a notch 117 of the ceiling 113 and bottom 111. The carriers 138 at the upper and bottom end of the vertical connector 137 may be identical.

In addition, as is illustrated in FIG. 10, the vertical connector 137 may be designed to transfer vertical forces between the ceiling 113 and the bottom 111, but allows a relative movement between the ceiling 113 and the bottom 111. Particularly, as illustrated, the bottom 111 may perform a substantially horizontal movement (indicated by moving distance A) relative to the ceiling 113, for example, due to vibrations or dynamic loads acting on the hull 110. The vertical connector 137 can be configured to allow such movement A, while the vertical distance between ceiling 113 and bottom 111 is maintained. This may be achieved by transferring axial forces (compression and tension forces) through the vertical connector 137, but allowing small rotational movements at the carriers 138. For instance, the carriers 138 may be hinged to the remainder of the vertical connector 137 or maybe flexibly mounted thereto.

Figure 11:
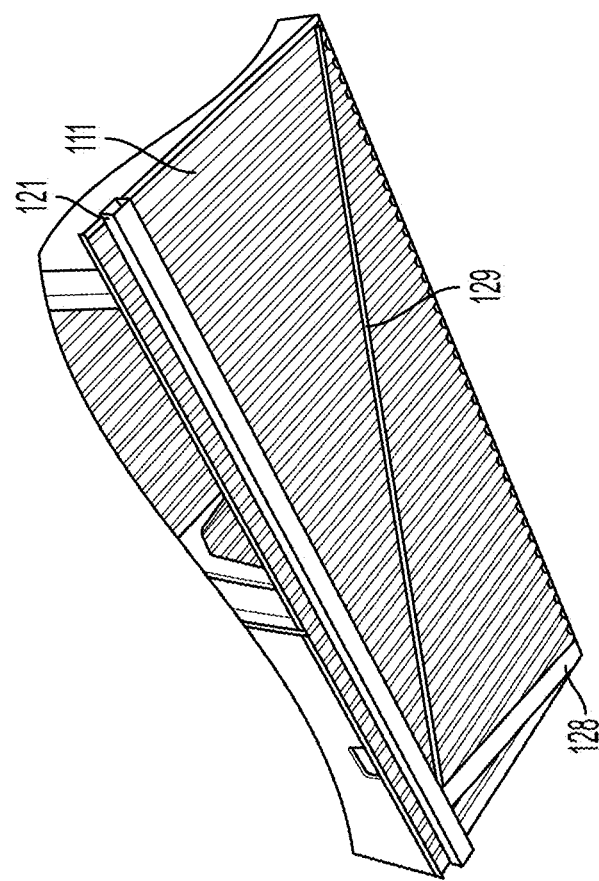
FIG. 11 schematically illustrates a perspective view of another exemplary stowage compartment from an underside thereof.

FIG. 11 schematically illustrates a perspective view of another exemplary stowage compartment 100 from an underside thereof. This stowage compartment 100 further comprises a truss consisting of a rod 128 configured to transfer compression forces (or compression and tension forces), and a cord 129 or cable configured to transfer tension forces. The rod 128 and the cord 129 can be fastened to the rail 121. An opposite end of the rod 128 and cord 129 can be mounted to a primary structure 5 of the aircraft 1, another rail (not illustrated) or any other installation rail, etc. . . .

The elements of the truss 128, 129 further strengthens the hull 110, particularly with respect to forces and moments induced in the bottom 111, as well as torsion acting on the hull 110 around a longitudinal axis of the hull 110.

FIG. 12 schematically illustrates a bottom cover 171 at an underside of a stowage compartment 100, and the bottom cover 171 when dissembled from the stowage compartment 100. This bottom cover 171 forms a lining or the like covering at least a portion of the bottom 111 and/or the rail 121 and/or the truss/truss elements 125, 128, 129. This bottom cover 171 may further include other components required in the aircraft 1. As is illustrated in FIG. 12, a channel 178 may be provided, into which such components can be installed. As a mere example, a personal service unit, fresh air nozzles, O2 masks, etc. can be installed in the channel 178 (also referred-to as personal service unit channel).

The bottom cover 171 can further include a plurality of structural webs 177 (or web plates). Such webs 177 may, on the one hand, connect the exterior portion of the bottom cover 171 (the visible lining) to an interior structure covering the bottom 111 of the self-supporting hull 110 and allowing mounting the bottom cover 171 to the self-supporting hull 110. On the other hand, such webs 177 increase stiffness of the entire bottom cover 171, which may further strengthen the bottom 111 and, hence, the hull 110.

Furthermore, the bottom cover 171 can have an integrated handrail 176. Such handrail 176 may be used by personal and/or passengers of the aircraft 1 to hold themselves while walking along an aisle, i.e., while walking along the stowage compartment 100.

Optionally, at the sides of the bottom cover 171 along the longitudinal direction (e.g., in the region of the hand rail 176 and opposite thereto) the bottom cover 171 may comprise one or more clips (not specifically illustrated) to mount the bottom cover 171 to the self-supporting hull 110. Likewise, a continuous longitudinal clip may be respectively formed along the entire sides or at one side of the bottom cover 171, allowing to clip the bottom cover 171 to the self-supporting hull 110.

Figure 13:
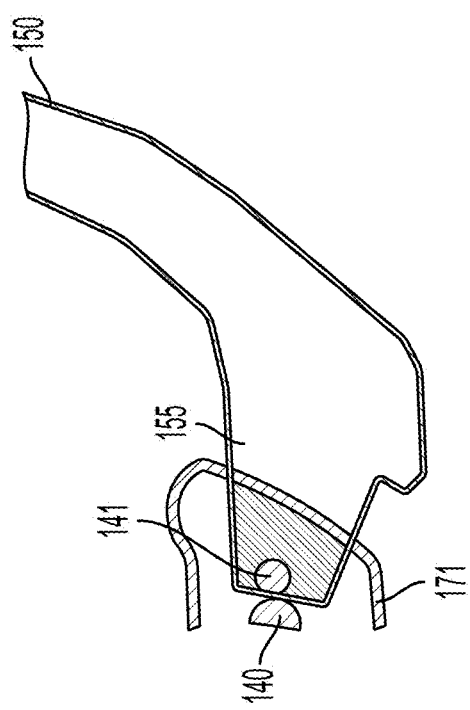
FIG. 13 schematically illustrates a cross-section of a bottom cover and a latch mechanism.

FIG. 13 schematically illustrates a cross-section of a bottom cover 171 and a latch mechanism. For instance, since the bottom cover 171 has a certain vertical dimension, which can be used for housing a latch mechanism 140, 141 (FIG. 8). Thus, the bottom cover 171 may have holes and/or openings or a longitudinal groove, into which the locking members 155 of a lid 150 can be inserted. The latch lever 140 and latch bolts 141 of the latch mechanism can be arranged at the inner end of these holes and/or openings or longitudinal groove. Thus, when the lid 150 is in a closed position, the latch bolts 141 can engage a respective eye 156 of the locking members 155, in order to lock the lid 150. Thus, the entire locking mechanism can be installed in the bottom cover 171 and the majority thereof can be hidden in the bottom cover 171, so that the fully assembled stowage compartment 100 as a good visual appearance.

Figure 14:
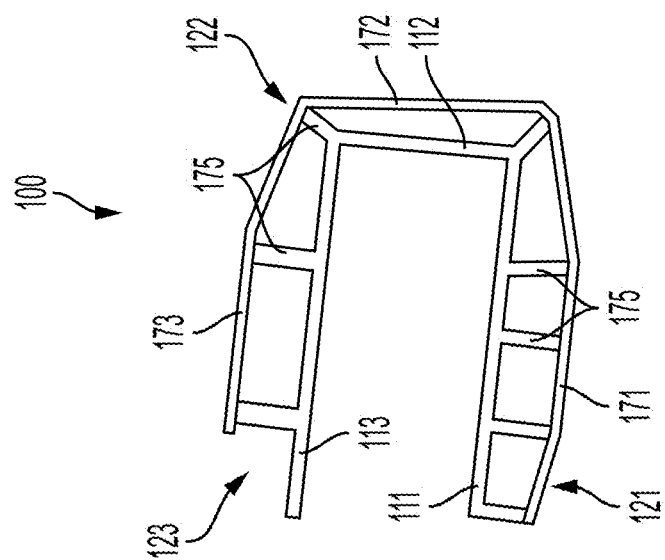
FIG. 14 schematically illustrates a cross-section of an exemplary self-supporting hull.

FIG. 14 illustrates a cross-section of another exemplary self-supporting hull 110. The illustrated self-supporting hull 110 can be manufactured from a thermoplastic material, particularly by extruding such thermoplastic material. The extruding allows forming an integrated body of the self-supporting hull 110 comprising not only a bottom 111, a rear wall 112 and/or ceiling 113, but also additional structural means.

As mere examples, FIG. 14 illustrates a bottom cover 171, a rear cover 172 and a ceiling cover 173. The bottom cover 171 may form a visible bottom surface of the stowage compartment 100. The covers 171, 172, 173 are integrally connected to the bottom 111, rear wall 112 and ceiling 113 by links 175 (only a few are provided with reference signs in FIG. 14 for increased clarity). Thus, a three-dimensional rigid structure can be formed in an integral manner due to extrusion. The extruding apparatus can have one or more dies corresponding to the cross-sectional shape of the hull 110.

Since such cross-sectional structure is integrally formed, a lightweight and statically strong self-supporting hull 110 can be formed. In addition, any visible portions of the overhead stowage compartment 100 can be integrally formed when manufacturing the hull 110. Such structure allows omitting any truss 125, 127 or other structural means for strengthening the self-supporting hull 110. As a mere example, the bottom cover 171 of FIG. 12 can be fully integrated into such self-supporting hull 110.

Furthermore, such structure may also be formed, so that one or more rails 121, 122, 123 can be mounted to the hull 110. FIG. 14 illustrates only the positions for such rails 121, 122 and 123 but omits the rails themselves for increased clarity. Alternatively, the rails 121, 122 and/or 123 can already be integrated into the hull 110, for instance by including the rails 121, 122, 123 into the extruded form. This may also include co-extrusion, where two different materials are extruded. For instance, coextrusion allows a structurally stronger material to be used for the rails 121, 122, 123, while the remaining material is lighter.

In any case, due to the coextrusion, an endless self-supporting hull 110 can be produced. The self-supporting hull 110 to be installed in an aircraft 1 can then be lengthened depending on the aircraft 1, customization of the aircraft 1, maximum load that can be carried by one or more workers, or any other constraints.

Figure 15:
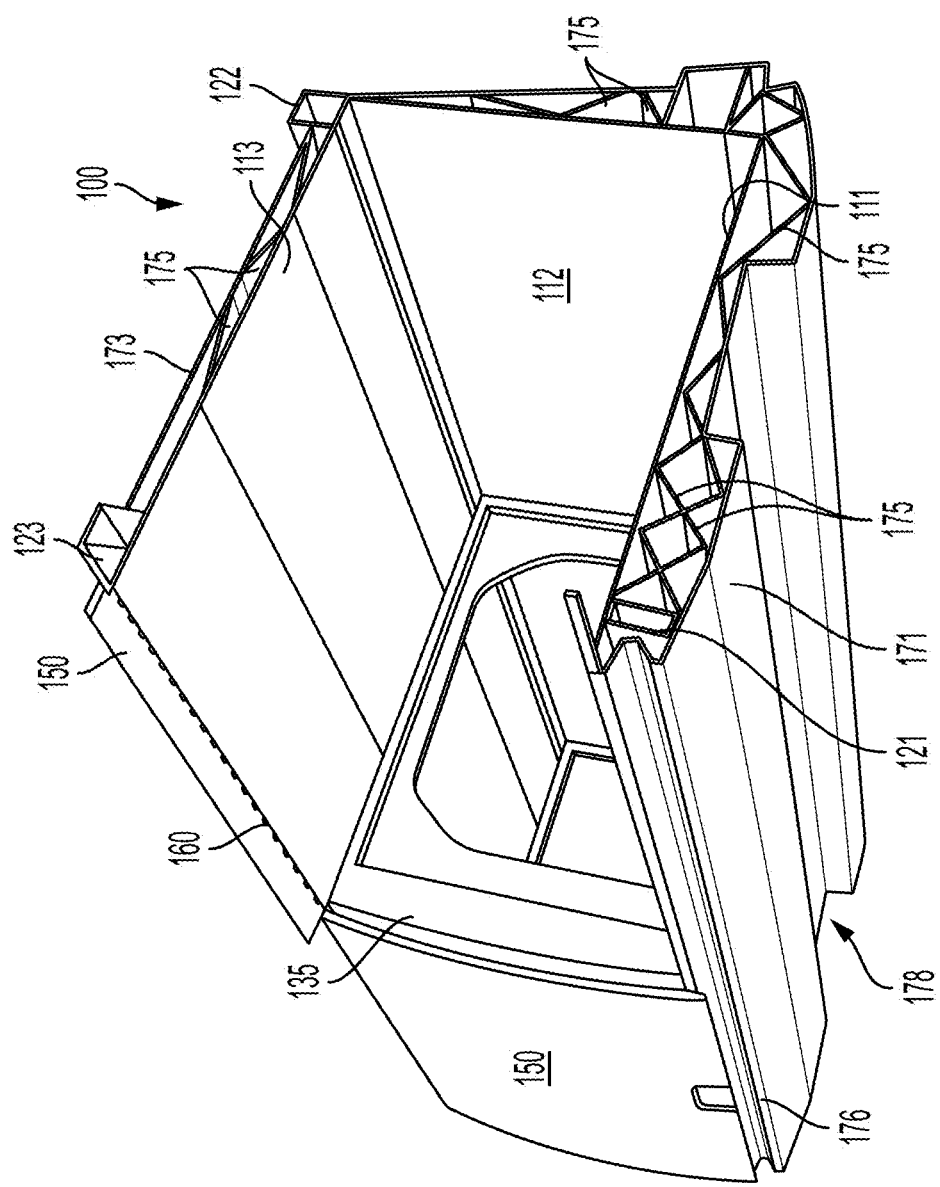
FIG. 15 schematically illustrates a cross-section of another exemplary self-supporting hull.

FIG. 15 schematically illustrates a perspective view of another exemplary self-supporting hull 110. The self-supporting hull 110 can be manufactured in the same manner as the hull 110 of FIG. 14, for example, by extruding. Such hull 110 can include a bottom cover 171 comparable to the bottom cover 171 of FIG. 12, but in this exemplary self-supporting hull 110, the bottom cover 171 is integrated into the remainder of the hull 110, i.e., it forms a single piece.

Likewise, the hull 110 can include a handrail 176 and a channel 178 at the bottom cover 171.

In addition, the self-supporting hull 110 comprises, as one piece, the bottom 111, the rear wall 112, the ceiling 113 and a plurality of structural webs 177 (or web plates) arranged on an exterior side of the bottom 111, rear wall 112 and ceiling 113 (i.e., a side facing away from the stowage space). Such structural webs 177 increase stiffness of the entire self-supporting hull 110, and may include the structural webs 177 illustrated in FIG. 12.

Moreover, the integrated one-piece hull 110 can further include rails 121, 122 and 123. Such rails 121, 122, 123 can be made of the same material as the structural webs 177 and/or the bottom 111, rear wall 112 and ceiling 113, which facilitates manufacturing such hull 110, for example by extruding a thermoplastic material. The thickness of the rails 121, 122, 123 may be chosen larger than the thickness of the structural webs 177 and/or other portions of the self-supporting hull 110.

As a mere example, the interior surfaces of the bottom 111, rear wall 112 and ceiling 113 are smooth, i.e., do not provide any notches 117 or the like. This facilitates manufacturing, particularly when extruding the entire hull 110. In addition, such smooth surfaces allow mounting a vertical connector 137 and/or separating wall 130, 135 anywhere along a longitudinal direction of the hull 110, i.e., irrespective of any notch pattern.

Figure 16:
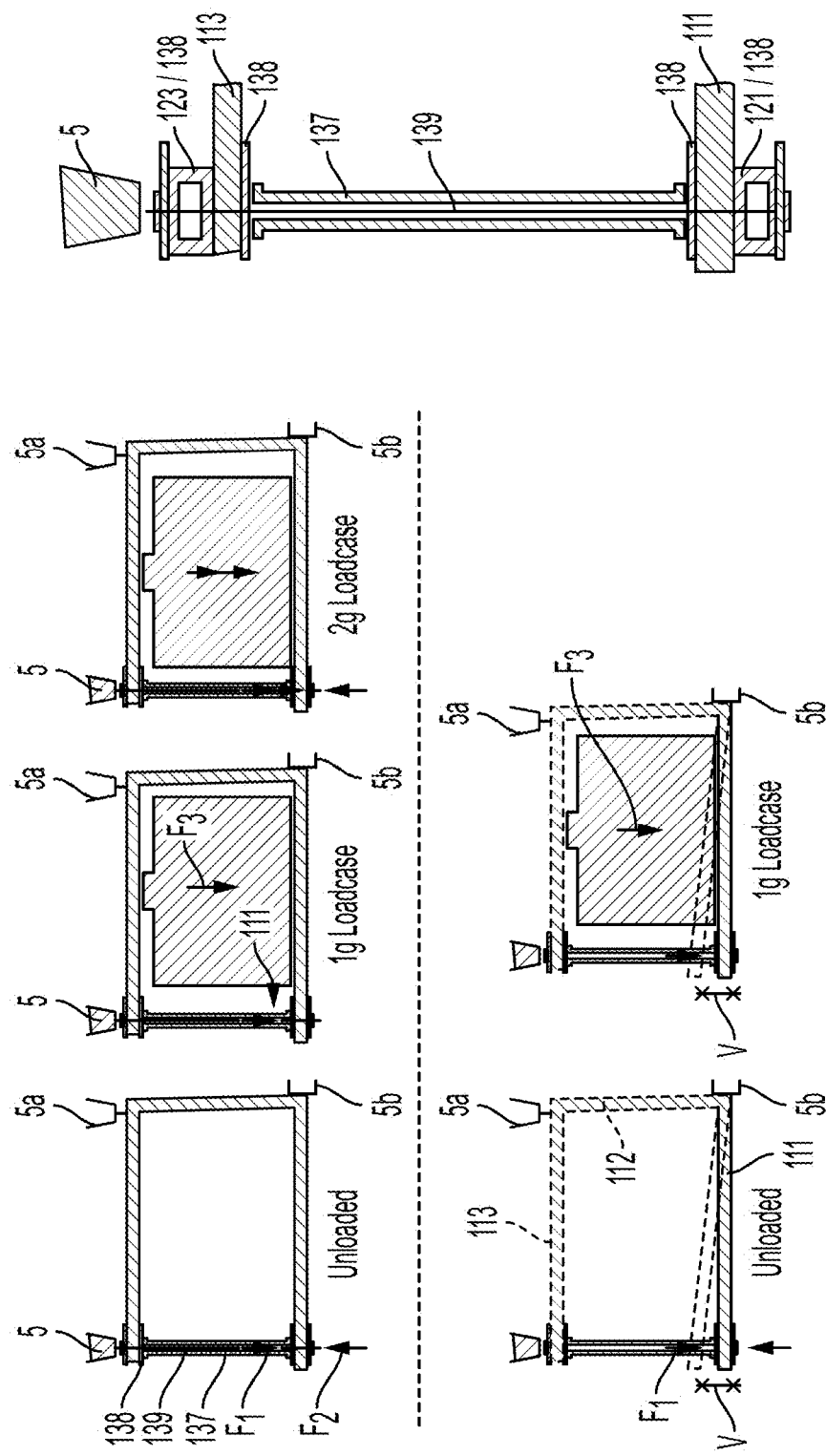
FIG. 16 schematically illustrates load cases of a self-supporting hull and a vertical connector.

FIG. 16 schematically illustrates load cases of a self-supporting hull 110 and a vertical connector 137. It is to be understood that the illustrated stowage compartment 100 is for illustrative purposes only, and any of the disclosed self-supporting hulls can be employed. Details of the vertical connector 137 are further illustrated in FIG. 16.

In the first (upper) case of FIG. 16, the unloaded (empty) self-supporting hull 110 is held in place by the self-supporting hull 110. As the left bottom corner of the self-supporting hull 110 will experience the largest deflection due to its self-weight, the vertical connector 137 will experience a tension force between bottom carrier 138 and upper carrier 138. To transfer such tension force to the primary structure 5 (5*a*, 5*b*), a cord 139 can be provided. For instance, the cord 139 can span from the bottom carrier 138 to the upper carrier 138, in order to receive and transfer any tension force. As can be seen in the detailed drawing, the cord 139 can be optionally mounted to the rails 121, 123 and/or the rails 121, 123 can form a part of the bottom and upper carriers 138.

The primary structure 5, 5*a*, 5*b* is only for illustrative purposes. Specifically, FIG. 16 illustrates three primary structures 5, 5*a*, 5*b*, two (5 and 5*a*) at the ceiling 113 and one (5*b*) at a rear wall 112. This is only one of a plurality of possible arrangements. The primary structure 5, 5*a*, 5*b* can also be an installation rail mounted to a primary structure frame or the like, i.e., forms an intermediate element between the actual primary structure and the self-supporting hull 110.

Since the vertical connector 137 spans the space between the bottom 111 and ceiling 113 of the hull 110, the cord 139 may be preloaded. Thus, a preloading tension force F2 may act between the bottom and ceiling carriers 138 and on the column-like vertical connector 137, which experiences a corresponding compression force F1.

When the stowage compartment 100 is loaded (1 g load case), for example, when luggage or cargo is placed in the stowage space, a load force F3 acts in the center of the stowage space. The corresponding momentum M1 onto the bottom 111 can also be transferred to the primary structure 5, 5a, 5b through the cord 139 and counteracts on the preloaded vertical connector 137 (force F1).

In case of an additional force (2 g load case or up to 3 g or 3.5 g) acting on the stowage compartment 100, such as during certain movements of the aircraft 1, the vertical connector 137 and/or cord 139 will be additionally loaded. In this load case, a deflection of portions of the stowage compartment 100, such as the bottom 111, the vertical connector 137, the cord 139, the ceiling 113 and/or the rear wall 112, may be visible, but minimal. In other words, the stowage compartment 100 acts elastically due to such load cases. This may be particularly relevant for any portion of the compartment 100 in a longitudinal direction between vertical connectors 137.

However, this is acceptable, as such load cases are rather seldom and the deflection is kept to a minimum. In any case, the bottom 111, rear wall 112, ceiling 113 and lid 150 are to be designed to securely hold the luggage or cargo in the stowage space, without any item falling out of the stowage space. As a mere example, a deflection of +/−2 mm or +/−5 mm or +/−8 mm can be acceptable. This has to be contemplated against the benefit of a lighter stowage compartment 100, which saves fuel.

Moreover, in case of severe situations, the stowage compartment 100 can be designed to withstand max load factors as required for certification, e.g., of 9 g forward (X), 1.65 g backwards (−X), 7.3 g downward (−Z), 5 g upward (+Z), and 3 g to the left and right (Y-axis direction). The material of the stowage compartment 100, particularly the self-supporting hull 110, the lid 150, as well as, the separating walls 130, 135 and the vertical connector 137 can be designed to allow a movement and/or a deflection of themselves as well as of further components of the stowage compartment 100 in a longitudinal direction (X-axis) up to +/−10 mm or even +/−25 mm, and in a vertical downwards direction (−Z) of up to 20 mm.

In the second (lower) case of FIG. 16, a similar structure is employed, but without a cord 139. Here the vertical connector 137 (column-like component) is designed to transfer compression forces as well as tension forces. In the unloaded load case, the bottom 111 can be preloaded. Specifically, as illustrated in dashed lines, the bottom 111 can be formed, so that a distance between its free end and the ceiling 113 is shorter than the length of the rear wall 112. As a mere example, the free end of the bottom 111 can deviate from a line (e.g., a horizontal line) by the distance V. Once the vertical connector 137 (or separating wall 130, 135) is mounted into the stowage space of the hull 110, the bottom 111 is arranged in the (horizontal) line and acts on the vertical connector 137 generating the compression force F1.

When the stowage compartment 100 is loaded (1 g load case), for example, when luggage or cargo is placed in the stowage space, a load force F3 acts in the center of the stowage space. This acts on the vertical connector 137 and substantially counterbalances with the preload force F1.

Any further load case may then be similar to the first (upper) case of FIG. 16.

Figure 17:
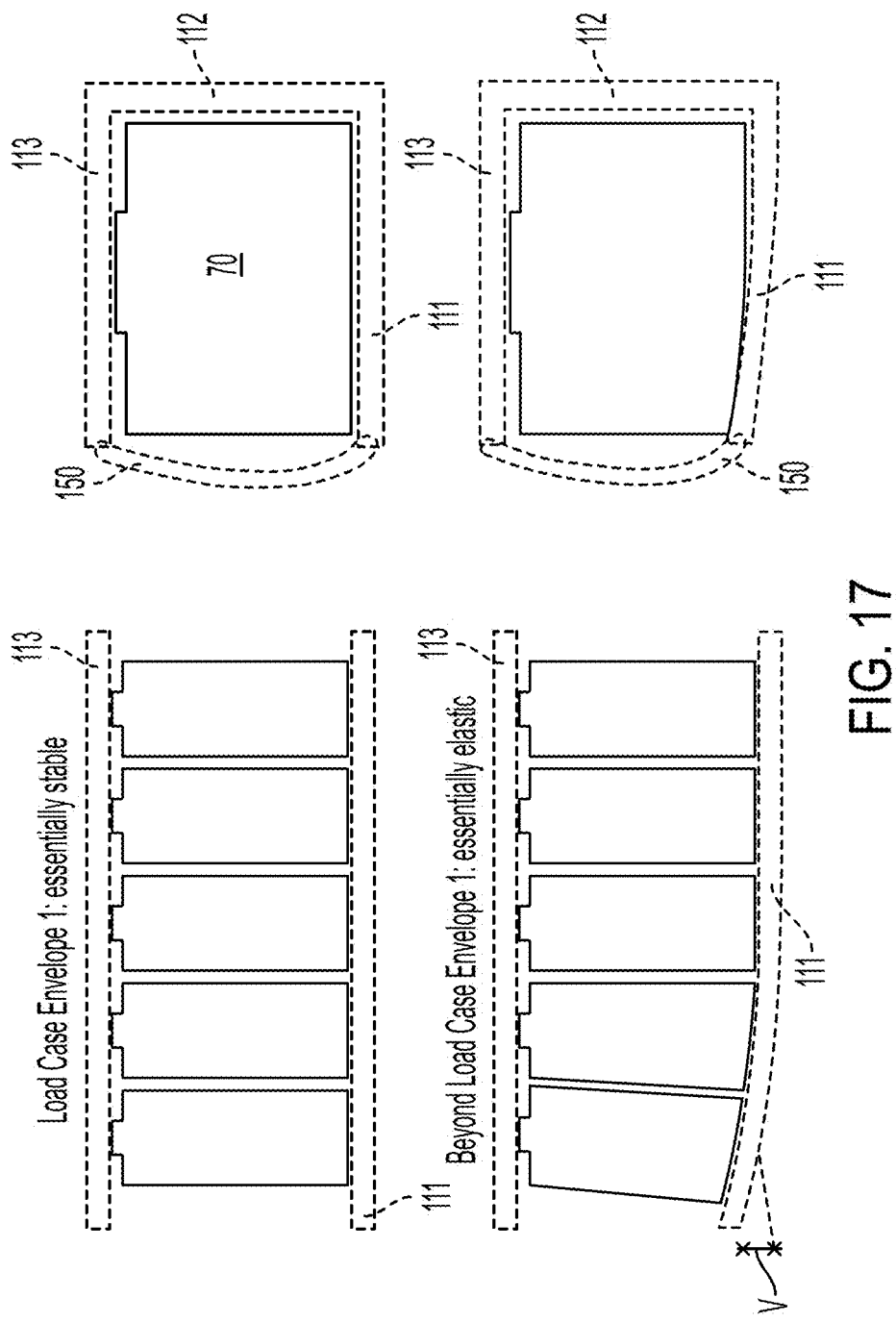
FIG. 17 schematically illustrates load cases of a self-supporting hull.

FIG. 17 schematically illustrates load cases of a self-supporting hull 110. Specifically, the material of the self-supporting hull 110, and particularly the bottom 111, the rear wall 112 and the ceiling 113, as well as the material of the lid 150 is elastically deformable in case of high load cases. As a mere example, for load cases of more than 2 g or more than 3 g, visible elastic deflection V may be present as illustrated in the bottom portion of FIG. 17. Such elasticities may be present due to a rather thin material chosen for these components of the stowage compartment 100. Such thin material is lighter compared to material of conventional stowage compartments, which significantly increases fuel efficiency of an aircraft 1 having a stowage compartment 100 of the present disclosure.

FIG. 18 schematically illustrates an aircraft 1, wherein an overhead stowage compartment 100 is installed. As illustrated in FIG. 18, the stowage compartment 100 extends over an entire length of the passenger cabin of the aircraft 1. This is to be understood as one example of the disclosed stowage compartment 100.

Figure 19:
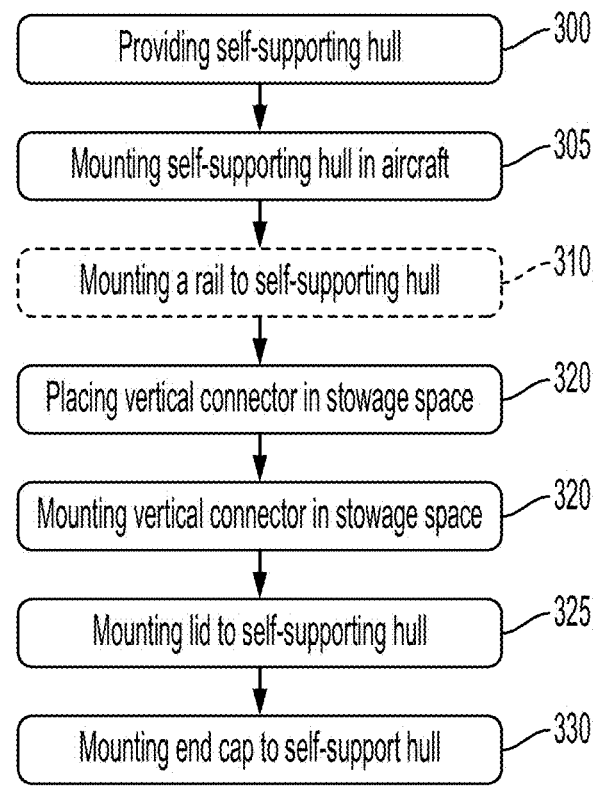
FIG. 19 schematically illustrates a flow diagram of a method for installing a stowage compartment.

FIG. 19 schematically illustrates a flow diagram of a method for installing a stowage compartment 100. The method can be performed to install any of the stowage compartments 100 illustrated and described in FIGS. 1 to 17. The method begins in step 300 with providing a self-supporting hull 110 having an open cross-section forming a stowage space and an opening 105 to the stowage space, wherein in a longitudinal direction of the self-supporting hull 110 any section of the self-supporting hull 110 has an open end in the front and rear.

Such providing of a self-supporting hull 110 can include manufacturing the hull 110. For instance, the self-supporting hull 110 can be made of a thermoplastic material. Such material may be formed to one plate or sheet that is formed into the cross-sectional shape of the self-supporting hull 110, or more than one plate or sheet is provided, which sheets are connected to one another having bends or corners. Such plate(s) or sheet(s) may have smooth surfaces, may have notches 117 on an interior or exterior side, or may be formed as a trapezoidal sheet having notches 117 on the interior and exterior side.

Alternatively, the providing of a self-supporting hull 110 can include manufacturing the hull 110 by extrusion. This allows forming a three-dimensional cross-section including additional structural means 175, 177, such as the self-supporting hull 110 as illustrated in FIG. 14 or 15. As a mere example, a bottom cover 171 may be formed to the hull 110 during the same extrusion process.

Then, in step 305, the self-supporting hull 110 is mounted to a primary structure 5 of the aircraft 1. This can include an optional step 310 of mounting one or more rails 121, 122, 123 to the hull 110 and/or to the primary structure 5. Such rail(s) 121, 122, 123 provides for distributing forces and loads between the mounting points of the primary structure 5 and the longitudinally extending self-supporting hull 110.

In step 315, at least one vertical connector 137 (and/or at least one separating wall 130) is placed into the stowage space. A separating wall 130 can separate the stowage space in the longitudinal direction of the self-supporting hull 110. Thereafter, in step 320, the vertical connector 137 (and/or the separating wall 130, 135) is mounted to the self-supporting hull 110 at vertical sides of the vertical connector 137 (and/or the separating wall 130, 135) in a load transferring manner. It is to be understood that more than one vertical connector 137 (and/or separating wall 130, 135) can be provided and mounted to the self-supporting hull 110.

In order to finalize the stowage compartment 100, in a step 325, at least one lid 150 is mounted at an arbitrary section of the self-supporting hull 110, wherein the at least one lid 150 is configured to close the opening 105 to the stowage space. As a mere example, the lid 150 is mounted to a ceiling 113 of the hull 110 as it is illustrated and explained with respect to FIG. 7.

Finally, in step 330, and end cap 180 can be mounted to the self-supporting hull 110. Such end cap 180 closes the stowage space at a longitudinal end of the stowage compartment 100, i.e., at the rear or front end of the self-supporting hull 110.

It is believed that the advantages of the technique presented herein will be fully understood from the foregoing description, and it will be apparent that various changes may be made in the form, constructions and arrangement of the exemplary aspects thereof without departing from the scope of the disclosure or without sacrificing all of its advantageous effects. Because the technique presented herein can be varied in many ways, it will be recognized that the disclosure should be limited only by the scope of the claims that follow.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An overhead stowage compartment, comprising:
   a self-supporting hull having an open cross-section forming a stowage space and an opening to the stowage space, wherein in a longitudinal direction of the self-supporting hull any section of the self-supporting hull has an open end in the front and rear;
   a vertical connector configured to be placed into the stowage space and mounted to the self-supporting hull at vertical sides of the vertical connector in a force transferring manner; and
   at least one lid mounted at a section of the self-supporting hull and configured to close the opening to the stowage space,
   wherein one of the self-supporting hull and the at least one lid comprises a plurality of knuckles and the other of the self-supporting hull and the at least one lid comprises a plurality of pins, each pin being configured to be inserted in one of the knuckles.

2. The overhead stowage compartment according to claim 1, further comprising:
   at least one rail running in the longitudinal direction and connected to the self-supporting hull; or
   at least one truss connected to the self-supporting hull; or both.

3. The overhead stowage compartment according to claim 1, further comprising:
   a second self-supporting hull having a seating element at a longitudinal end of the second self-supporting hull, wherein the seating element of the second self-supporting hull is configured to receive a longitudinal end of the self-supporting hull to form a continuous stowage space.

4. The overhead stowage compartment according to claim 1, wherein the self-supporting hull comprises a bottom, a rear wall, and a ceiling, and
   wherein at least the bottom and the ceiling have a plurality of notches configured to receive the vertical connector.

5. The overhead stowage compartment according to claim 4, wherein each notch includes a section overlapping a section of the vertical connector in a vertical direction and allowing a form fit between the notch and the vertical connector.

6. The overhead stowage compartment according to claim 1, further comprising:
   a plurality of hinges configured to couple the self-supporting hull and the at least one lid; or
   a piano hinge configured to couple the self-supporting hull and the at least one lid; or
   both.

7. The overhead stowage compartment according to claim 1,
   wherein the plurality of knuckles comprises five or more knuckles and the plurality of pins comprises five or more pins.

8. The overhead stowage compartment according to claim 6, further comprising:
   a hinge stop,
   wherein the at least one lid is formed to abut against the hinge stop, when the at least one lid is in a closed position or in a fully open position.

9. The overhead stowage compartment according to claim 1, further comprising:
   a latch lever having a plurality of latch bolts,
   wherein the at least one lid includes a plurality of locking members, each locking member having an eye, and
   wherein each latch bolt is configured to engage an eye of one of the locking members when the latch lever is moved into a locking position.

10. The overhead stowage compartment according to claim 1, further comprising:
    a separating wall separating the stowage space in the longitudinal direction of the self-supporting hull.

11. The overhead stowage compartment according to claim 1, further comprising:
    an end cap coupled to the self-supporting hull and closing the stowage space at a longitudinal end of the self-supporting hull,
    wherein the end cap is formed to extend the stowage space of the self-supporting hull in the longitudinal direction.

12. An aircraft comprising:
    the overhead stowage compartment according to claim 1.

13. A method for installing an overhead stowage compartment in an aircraft, the method comprising:
    providing a self-supporting hull having an open cross-section forming a stowage space and an opening to the stowage space, wherein in a longitudinal direction of the self-supporting hull any section of the self-supporting hull has an open end in the front and rear;
    mounting the self-supporting hull to a primary structure of the aircraft;
    placing at least one vertical connector into the stowage space;
    mounting the vertical connector to the self-supporting hull at vertical sides of the vertical connector in a load transferring manner; and
    mounting at least one lid at a section of the self-supporting hull, wherein the at least one lid is configured to close the opening to the stowage space, wherein mounting the at least one lid comprises positioning the at least one lid, so that a plurality of knuckles is arranged next to a plurality of pins, and moving the at least one lid to engage each of the plurality of knuckles with one of the plurality of pins, and wherein the plurality of knuckles is arranged at the self-supporting hull and the plurality of pins is arranged at the at least one lid, or the plurality of knuckles is arranged at the at least one lid and the plurality of pins is arranged at the self-supporting hull.

14. The method according to claim 13, further comprising:

mounting at least one rail, or at least one truss, or both to the self-supporting hull along the longitudinal direction.

15. The method according to claim 13, further comprising:

mounting an end cap to the self-supporting hull, the end cap closing the stowage space at a longitudinal end of the self-supporting hull.

16. The method according to claim 13, further comprising:

mounting a separating wall to the self-supporting hull, the separating wall separating the stowage space in the longitudinal direction of the self-supporting hull.

17. An overhead stowage compartment, comprising:

a self-supporting hull having an open cross-section forming a stowage space and an opening to the stowage space, wherein in a longitudinal direction of the self-supporting hull any section of the self-supporting hull has an open end in the front and rear, wherein the self-supporting hull comprises a bottom, a rear wall, and a ceiling;

a vertical connector configured to be placed into the stowage space and mounted to the self-supporting hull at vertical sides of the vertical connector in a force transferring manner; and at least one lid mounted at a section of the self-supporting hull and configured to close the opening to the stowage space, wherein at least the bottom and the ceiling have a plurality of notches configured to receive the vertical connector, and wherein each notch includes a section overlapping a section of the vertical connector in a vertical direction and allowing a form fit between the notch and the vertical connector.

* * * * *